United States Patent
Pillman et al.

(10) Patent No.: US 7,995,116 B2
(45) Date of Patent: Aug. 9, 2011

(54) VARYING CAMERA SELF-DETERMINATION BASED ON SUBJECT MOTION

(75) Inventors: Bruce H. Pillman, Rochester, NY (US); Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/728,467

(22) Filed: Mar. 22, 2010

(65) Prior Publication Data

US 2010/0171837 A1 Jul. 8, 2010

Related U.S. Application Data

(60) Division of application No. 11/434,482, filed on May 15, 2006, now abandoned, which is a continuation-in-part of application No. 11/399,076, filed on Apr. 6, 2006, now abandoned.

(51) Int. Cl.
  *H04N 5/235* (2006.01)
  *H04N 5/225* (2006.01)
(52) U.S. Cl. .............. 348/229.1; 348/333.11
(58) Field of Classification Search ........ 348/229.1, 348/333.11
  See application file for complete search history.

(56) References Cited

U.S. PATENT DOCUMENTS

| | | | |
|---|---|---|---|
| 4,887,121 A | 12/1989 | Pritchard | |
| 5,049,997 A | 9/1991 | Arai | |
| 5,164,831 A | 11/1992 | Kuchta et al. | |
| 5,440,369 A | 8/1995 | Tabata et al. | |
| 5,757,226 A | 5/1998 | Yamada et al. | |
| 5,805,733 A * | 9/1998 | Wang et al. | 382/232 |
| 5,926,218 A | 7/1999 | Smith | |
| 6,128,047 A | 10/2000 | Chang et al. | |
| 6,130,912 A | 10/2000 | Chang et al. | |
| 6,301,440 B1 | 10/2001 | Bolle et al. | |
| 6,323,898 B1 | 11/2001 | Koyanagi et al. | |
| 6,424,805 B2 | 7/2002 | Ohsawa | |
| 7,030,911 B1 * | 4/2006 | Kubo | 348/221.1 |
| 7,042,509 B2 | 5/2006 | Onuki | |
| 7,301,563 B1 | 11/2007 | Kakinuma et al. | |
| 7,495,699 B2 | 2/2009 | Nayar et al. | |

(Continued)

FOREIGN PATENT DOCUMENTS

EP  1 035 510  9/2000

(Continued)

OTHER PUBLICATIONS

"Efficient Block Motion Estimation Using Integral Projections", K. Sauer and B. Schwartz, IEEE Trans. On Circuits and Systems for Video Technology, 6(5), 1996, pp. 513-518.

(Continued)

*Primary Examiner* — Sinh Tran
*Assistant Examiner* — Dillon Durnford-Geszvain
(74) *Attorney, Agent, or Firm* — Raymond L. Owens

(57) ABSTRACT

In a method and digital camera, an initial set of evaluation images are captured. A plurality of characteristics of the initial set of evaluation images are assessed to provide a first assessment. The characteristics include subject motion between the initial set of evaluation images. When the subject motion is in excess of a predetermined threshold, a final capture state of the camera is set responsive to the first assessment. When the subject motion is less than the predetermined threshold, the evaluation images are analyzed to provide analysis results and the final capture state of the camera is set responsive to the first assessment and the analysis results.

8 Claims, 17 Drawing Sheets

U.S. PATENT DOCUMENTS

| | | |
|---|---|---|
| 2002/0158986 A1 | 10/2002 | Baer |
| 2003/0007076 A1 | 1/2003 | Okisu et al. |
| 2003/0026607 A1 | 2/2003 | Okisu et al. |
| 2003/0098914 A1 | 5/2003 | Easwar |
| 2003/0197792 A1 | 10/2003 | Kikuchi |
| 2005/0099541 A1 | 5/2005 | Bennett et al. |
| 2007/0248330 A1 | 10/2007 | Pillman et al. |
| 2009/0041359 A1 | 2/2009 | Park |

FOREIGN PATENT DOCUMENTS

| | | |
|---|---|---|
| JP | 2003344891 | 3/2003 |

OTHER PUBLICATIONS

"Real-time Digital Video Stabilization for Multi-media Applications", K. Ratakonda, IEEE International Symposium on Circuits and Systems, 1998, vol. 4, pp. 69-72.

"Statistical Color Models With Application to Skin Detection", Michael J. Jones and James M. Rehg, International Journal of Computer Vision, vol. 46, No. 1, Jan. 2002, pp. 1-23.

"Computer and Robot Vision", Robert M. Haralick and Linda G. Shapiro, vol. 1, Addison-Wesley, 1992, pp. 28-48.

* cited by examiner

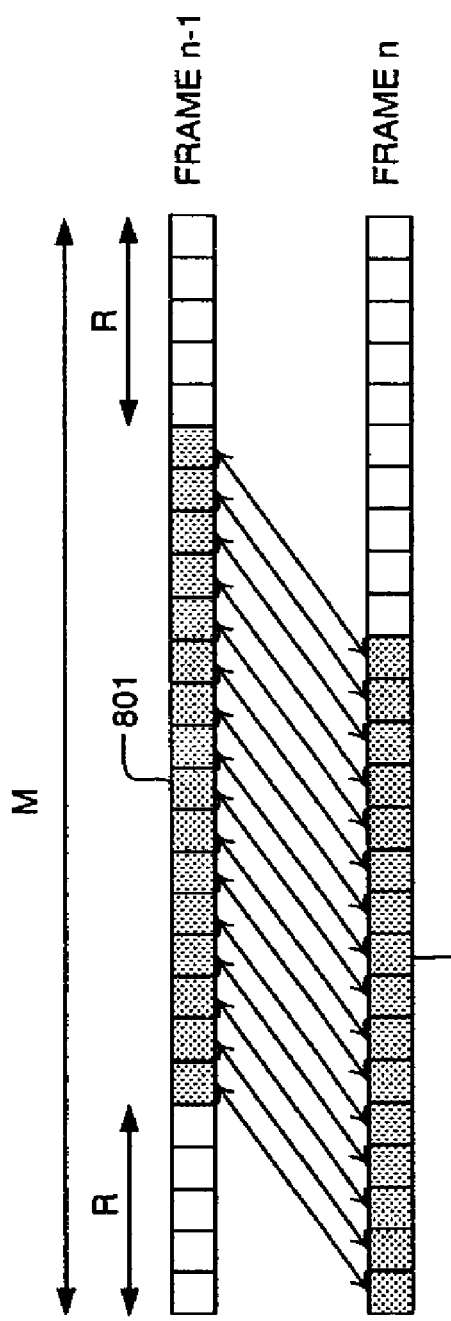
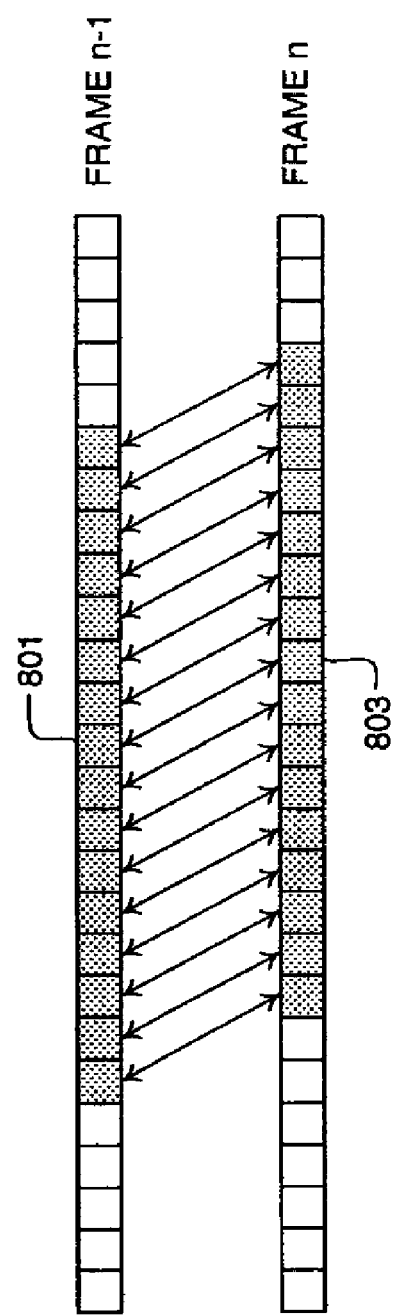

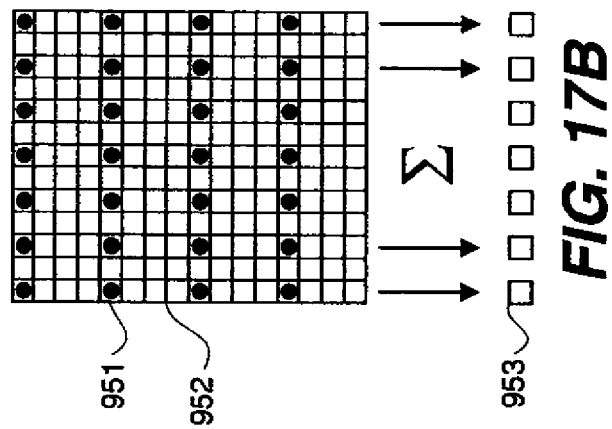
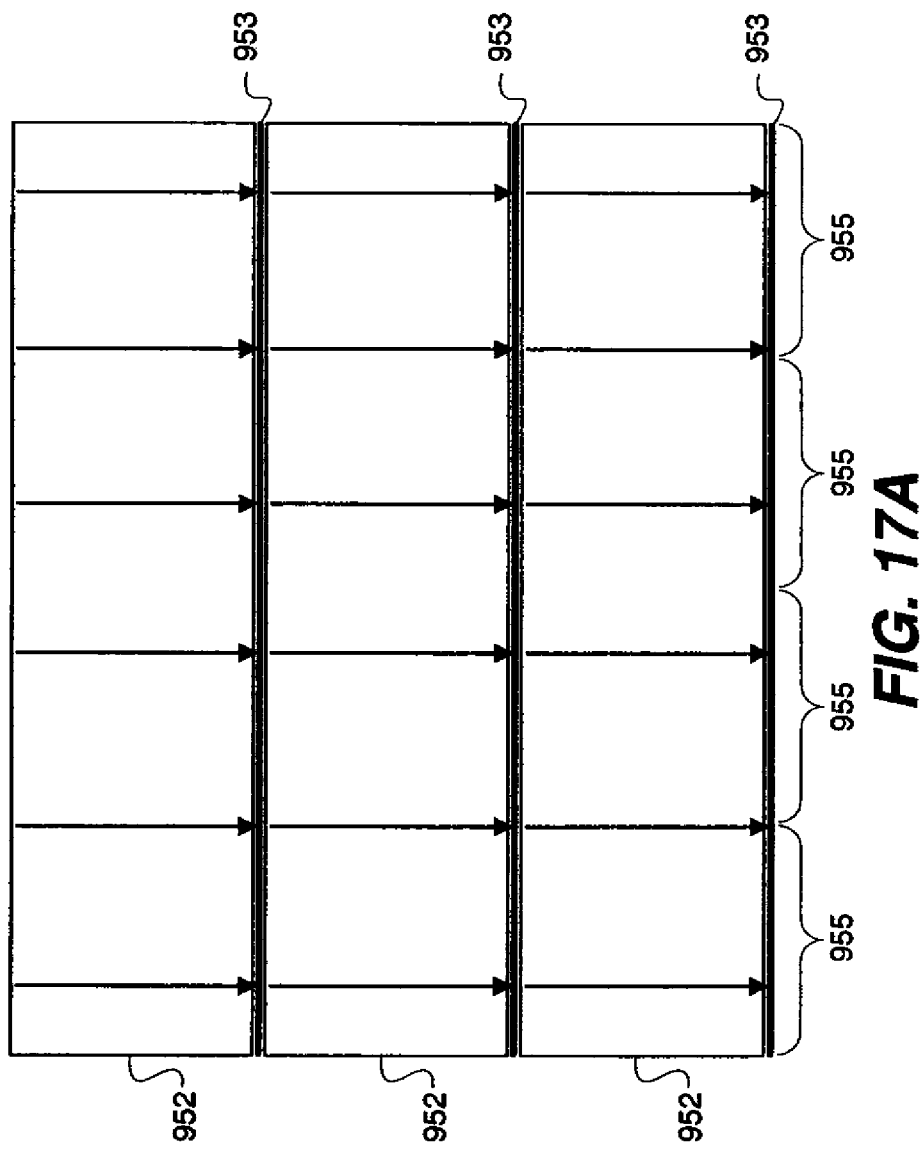

VARYING CAMERA SELF-DETERMINATION BASED ON SUBJECT MOTION

CROSS REFERENCE TO RELATED APPLICATIONS

This is a divisional of prior U.S. Ser. No. 11/434,482, filed on May 15, 2006 now abandoned, by Bruce H. Pillman et al, which is a continuation-in-part of application Ser. No. 11/399,076 filed on Apr. 6, 2006 now abandoned by Bruce H. Pillman et al. each of which is incorporated herein by reference in its entirety Reference is made to commonly assigned, co-pending U.S. patent application Ser. No. 11/398,872, filed Apr. 6, 2006, entitled: CAMERA AND METHOD WITH ADDITIONAL EVALUATION IMAGE CAPTURE BASED ON SCENE BRIGHTNESS CHANGES, in the names of Bruce H. Pillman and Jiebo Luo.

FIELD OF THE INVENTION

The invention relates to photography and photographic equipment and methods and more particularly relates to varying camera self-determination based on subject motion.

BACKGROUND OF THE INVENTION

In capturing a scene with a camera, many parameters affect the quality and usefulness of the captured image. In addition to controlling overall exposure, exposure time affects motion blur, f/number affects depth of field, and so forth. In many cameras, all or some of these parameters can be controlled and are conveniently referred to as camera settings.

Methods for controlling exposure and focus are well known in both film-based and electronic cameras. However, the level of intelligence in these systems is limited by resource and time constraints in the camera. In many cases, knowing the type of scene being captured can lead easily to improved selection of capture parameters. For example, knowing a scene is a portrait allows the camera to select a wider aperture, to minimize depth of field. Knowing a scene is a sports/action scene allows the camera to automatically limit exposure time to control, motion blur and adjust gain (exposure index) and aperture accordingly. Because this knowledge is useful in guiding simple exposure control systems, many film, video, and digital still cameras include a number of scene modes that can be selected by the user. These scene modes are essentially collections of parameter settings, which direct the camera to optimize parameters, given the user's selection of scene type.

The use of scene modes is limited in several ways. One limitation is that the user must select a scene mode for it to be effective, which is often inconvenient, even if the user understands the utility and usage of the scene modes.

A second limitation is that scene modes tend to oversimplify the possible kinds of scenes being captured. For example, a common scene mode is "portrait", optimized for capturing images of people. Another common scene mode is "snow", optimized to capture a subject against a background of snow, with different parameters. If a user wishes to capture a portrait against a snowy background, they must choose either portrait or snow, but they cannot combine aspects of each. Many other combinations exist, and creating scene modes for the varying combinations is cumbersome at best.

In another example, a backlit scene can be very much like a scene with a snowy background, in that subject matter is surrounded by background with a higher brightness. Few users are likely to understand the concept of a backlit scene and realize it has crucial similarity to a "snow" scene. A camera developer wishing to help users with backlit scenes will probably have to add a scene mode for backlit scenes, even though it may be identical to the snow scene mode.

Both of these scenarios illustrate the problems of describing photographic scenes in way accessible to a casual user. The number of scene modes required expands greatly and becomes difficult to navigate. The proliferation of scene modes ends up exacerbating the problem that many users find scene modes excessively complex.

Attempts to automate the selection of a scene mode have been made. For example, United States Published Patent Application US 2003/0007076 A1, "Image Processing Apparatus and Image-Quality Control Method," Noriyuki Okisu et al, assigned to Minolta Co., Ltd., published Jan. 9, 2003, teaches a method for automatic selection of scene mode based on focus data, scene brightness, and focal length. Similarly, U.S. Pat. No. 6,301,440, "System and Method for Automatically Setting Image Acquisition Parameters," Rudolf M. Bolle et al, assigned to International Business Machines Corp., issued Oct. 9, 2001, teaches a method for automatic selection of a scene mode and use of a photographic expert unit to automatically set parameters for image capture. Both of these methods disclose ways to use information from evaluation images and other data to determine a scene mode. The scene mode then is used to select a set of capture parameters from several sets of capture parameters that are optimized for each scene mode.

A limitation on automated methods is that such methods tend to be computationally intensive relative to the simpler methods. Cameras tend to be relatively limited in computing resources, in order to reduce cost, cut energy drain, and the like. This has resulted in noticeable lag between shutter trip and image capture in some cameras. Such lag is highly undesirable when a subject to be photographed is in motion. One solution to the problem of lag is avoidance of highly time consuming computations. This leads back again to the use of modes.

It would thus be desirable to provide improved cameras and methods, in which camera settings are automatically determined and the above shortcomings are at least partially mitigated.

SUMMARY OF THE INVENTION

The invention is defined by the claims. The invention, in broader aspects, provides methods and cameras, in which a camera capture state is self-determined by the camera. An initial set of evaluation images are captured and characteristics of the initial set of evaluation images are assessed to provide a first assessment. Those characteristics include subject motion between the initial set of evaluation images. When the subject motion is in excess of a predetermined threshold, a final capture state of the camera is set responsive to the first assessment. When the subject motion is less than the predetermined threshold the evaluation images are further analyzed to provide analysis results and the final capture state is set responsive to the analyzing. In a particular embodiment of the invention, when said subject motion is less than the predetermined threshold one or more additional evaluation images are captured after the capturing of the initial set of evaluation images and their characteristics are determined to provide a second assessment. The second assessment is analyzed to provide analysis results and the final capture state is responsive to all of the analysis results.

It is an advantageous effect of the invention that improved cameras and methods are provided, which allow camera settings to be automatically determined in a computationally intensive manner and also allow subject motion to be accommodated.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIGS. 15A-15B are diagrammatical views illustrating image data used in the motion estimation to compute costs associated with different motion offsets in the camera of FIG. 1.

FIGS. 17A-17B are the same views as FIGS. 16A-16B of the summation of data within columns to form vectors used for the motion analysis of the camera of FIG. 1.

DETAILED DESCRIPTION OF THE INVENTION

Figure 1:
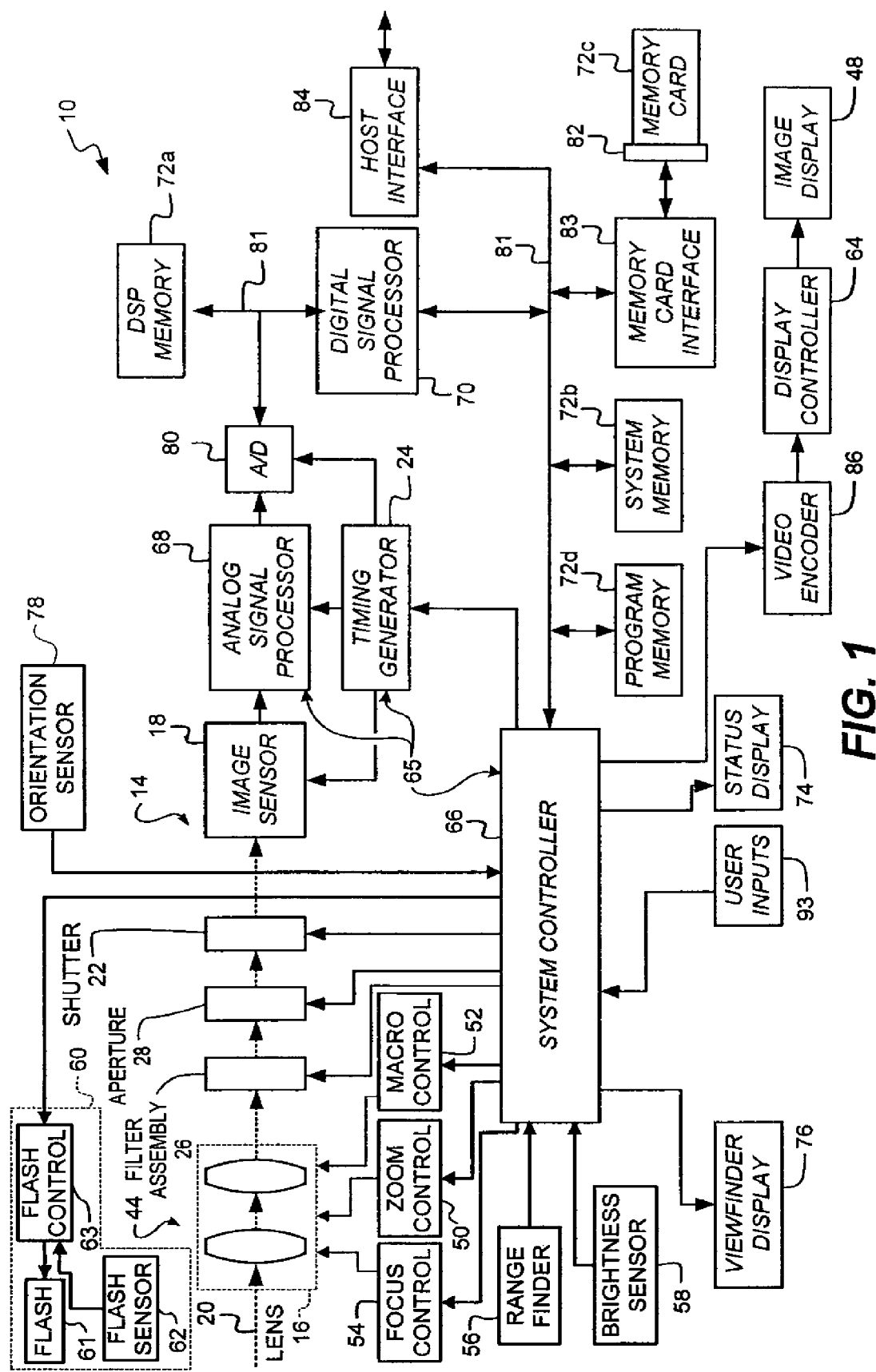
FIG. 1 is a block diagram showing the major components of a digital camera.
Figure 2:
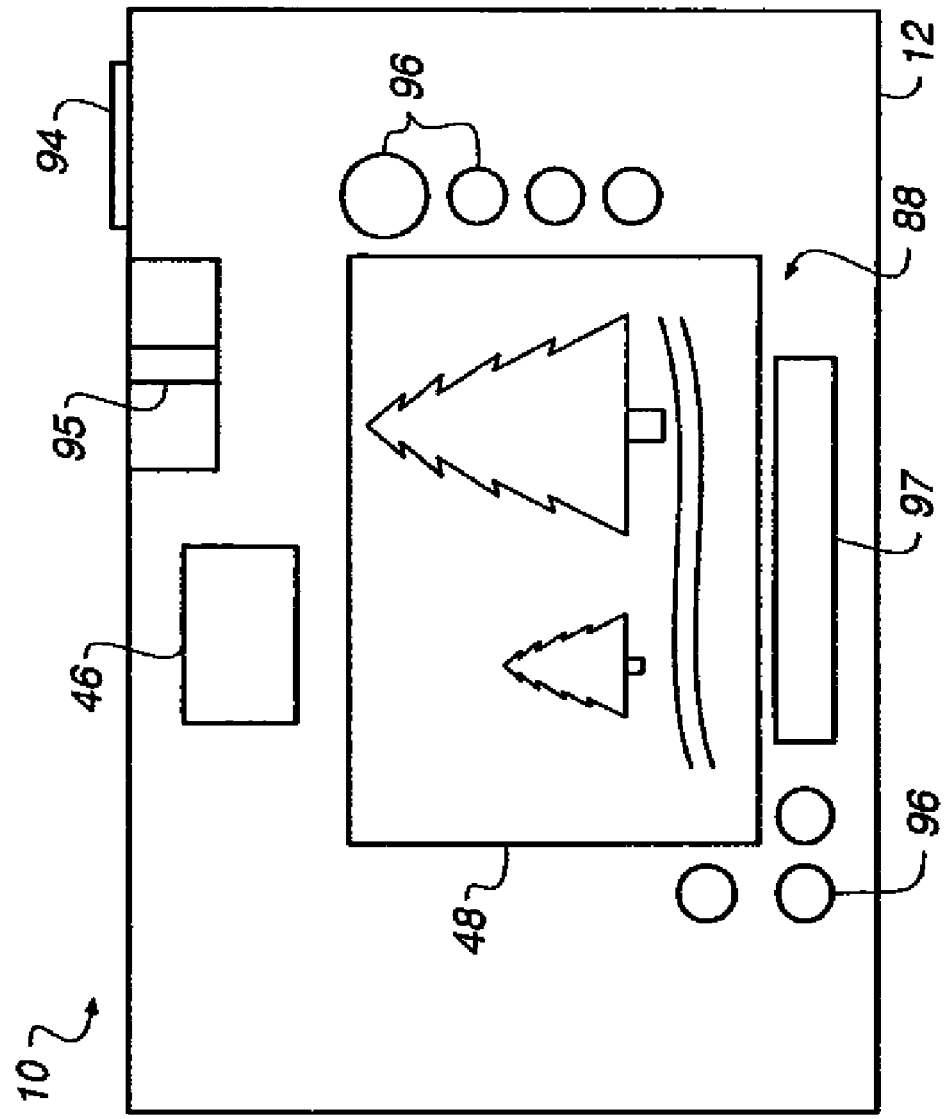
FIG. 2 is a semi-diagrammatical rear view of the camera of FIG. 1.

The following discussion refers to both still cameras and video cameras. It will be understood that the respective terms are inclusive of both dedicated still and video cameras and of combination still/video cameras, as used for the respective still or video capture function.

The term "capture state" is used herein to refer collectively to a plurality of camera settings that are or can be used together during a particular picture taking event to moderate how a light image is captured. Each setting is variable and affects one or more characteristics of an archival image captured and stored by the camera. Examples of settings include: lens aperture, lens focal length, shutter speed, flash condition, focus parameters, exposure parameters, white balance, image resolution, sensor gain, color saturation, sharpening filter parameters, and the like. Settings available with an individual camera vary depending upon camera characteristics. A capture state may or may not fully determine settings for a particular image capture. For example, a capture state can define flash output prior to picture taking or can define flash output as being met when light returned from a photographed subject reaches a particular level. Similarly, a capture state can define settings, which will be applied in the absence of a user override of one or more of those settings. For example, focus can be set by the user to remain at infinity, during a particular picture taking session. Likewise, a capture state can define one or more alternate settings based upon a later determined parameter, such as user activation of full flash or fill flash.

The term "archival image" is used herein to refer to a digital image stored in memory and accessible to the user following a capture event. An archival image is distinguished from other non-archival electronic images produced during capture of a light image of a scene. Such non-archival images include earlier images in the imaging chain leading to the archival image, such as the initial analog electronic image captured by the image sensor of the camera and the initial digital image produced by digitizing the initial analog image. In those cases, the non-archival images and the resulting archival image are all produced from the same light image. Another type of non-archival images is images used in viewfinding, setting exposure and focus, and the like. These non-archival images may be shown to the user on a viewfinder or the like, but are not made available for ordinary use subsequent to capture. These non-archival images can be automatically deleted by reuse of the memory used for storing them.

The terms "evaluation image" and "final image" are also used herein. Evaluation images are captured during camera set-up. Final images are captured following camera set-up. Final images are archival images. Evaluation images can be archival or non-archival, depending on camera set-up. Evaluation images can have the same resolution as archival images or can have a lower resolution. Depending upon the type of image sensor, it may be convenient to capture each evaluation image as a high resolution image, followed by irreversible conversion to a sampled, low resolution subset of the original image. The low resolution subset can be provided using the method described in commonly-assigned U.S. Pat. No. 5,164, 831 "ELECTRONIC STILL CAMERA PROVIDING MULTI-FORMAT STORAGE OF FULL AND REDUCED RESOLUTION IMAGES" to Kuchta, et al. Two electronic capture units can be present in the camera, with one used as the evaluation image capture unit and the other used as the archival image capture unit. An example of a suitable digital camera having two such electronic capture units is described in U.S. Pat. No. 5,926,218, entitled "ELECTRONIC CAMERA WITH DUAL RESOLUTION SENSORS" to Smith.

The camera can be a still camera, a video camera, or combine both capabilities. With a still camera, it is typically convenient to treat evaluation images as non-archival, on the assumption that the user intended to capture only the final image and the evaluation images are surplusage. With a video camera, it is typically convenient to treat both evaluation and final images as archival, on the assumption that the user intended to capture all available images. Individual cameras can be limited to a particular set-up or treatment of evaluation images can be varied automatically or as a user-selectable option. More complex arrangements are also possible, such as treating different evaluation images in a capture sequence differently. For convenience, the discussion here is limited to embodiments, in which evaluation images from a still-capture event are all non-archival and evaluation images from a video-capture event are all archival. It will be understood that like considerations apply to other embodiments.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. Other aspects of such algorithms and apparatus, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

Referring to FIGS. 1-5, in a particular embodiment, the camera 10 has a body 12 that provides structural support and protection for other components. The body 12 can be varied to meet requirements of a particular use and style considerations. An electronic image capture unit 14, which is mounted in the body 12, has a taking lens 16 and an electronic array image sensor 18 aligned with the taking lens 16. Light from a subject scene propagates along an optical path 20 through the taking lens 16 and strikes the image sensor 18 producing an analog electronic image.

The type of image sensor used may vary, but it is highly preferred that the image sensor be one of the several solid-state image sensors available. For example, the image sensor can be a charge-coupled device (CCD), a CMOS sensor (CMOS), or charge injection device (CID). The electronic image capture unit includes other components associated with the image sensor. A typical image sensor is accompanied by separate components that act as clock drivers (also referred to herein as a timing generator), analog signal processor (ASP) and analog-to-digital converter/amplifier (A/D converter). Such components can also incorporated in a single unit with the image sensor. For example, CMOS image sensors are manufactured with a process that allows other components to be integrated onto the same semiconductor die.

The electronic image capture unit 14 captures an image with three or more color channels. It is currently preferred that a single image sensor be used along with a color filter array, however, multiple monochromatic image sensors and filters can be used. Suitable filters are well known to those of skill in the art, and, in some cases are incorporated with the image sensor to provide an integral component.

Those skilled in the art will recognize that some procedures described herein in relation to digital images having multiple color channels can also be limited to one or more of the channels, but less than all of the channels. Suitability of this approach can be determined heuristically. Those skilled in the art will also recognize that for digital image processing steps described herein as replacing original pixel values with processed pixel values is functionally equivalent to describing the same processing steps as generating a new digital image with the processed pixel values while retaining the original pixel values.

The electrical signal from each pixel of the image sensor 18 is related to both the intensity of the light reaching the pixel and the length of time the pixel is allowed to accumulate or integrate the signal from incoming light. This time is called the integration time or exposure time.

Integration time is controlled by a shutter 22, that is switchable between an open state and a closed state. The shutter 22 can be mechanical or electromechanical or can be provided as a logical function of the hardware and software of the electronic image capture unit. For example, some types of image sensors allow the integration time to be controlled electronically by resetting the image sensor and then reading out the image sensor some time later. When using a CCD, electronic control of the integration time of the image sensor 18 can be provided by shifting the accumulated charge under a light shielded register provided at a non-photosensitive region. This can be a full frame as in a frame transfer device CCD or a horizontal line in an interline transfer device CCD. Suitable devices and procedures are well known to those of skill in the art. Thus, the timing generator 24 can provide a way to control when the image sensor 18 is actively recording the image. In the camera 10 of FIG. 1, the shutter 22 and the timing generator 24 jointly determine the integration time.

The combination of overall light intensity and integration time is called exposure. Equivalent exposures can be achieved by various combinations of light intensity and integration time. Although the exposures are equivalent, a particular exposure combination of light intensity and integration time may be preferred over other equivalent exposures for capturing an image of a given scene.

Although FIG. 1 shows several exposure controlling elements, some embodiments may not include one or more of these elements, or there may be alternative mechanisms of controlling exposure. The camera can have alternative features to those illustrated. For example, shutters that also function as diaphragms are well-known to those of skill in the art.

Figure 4:
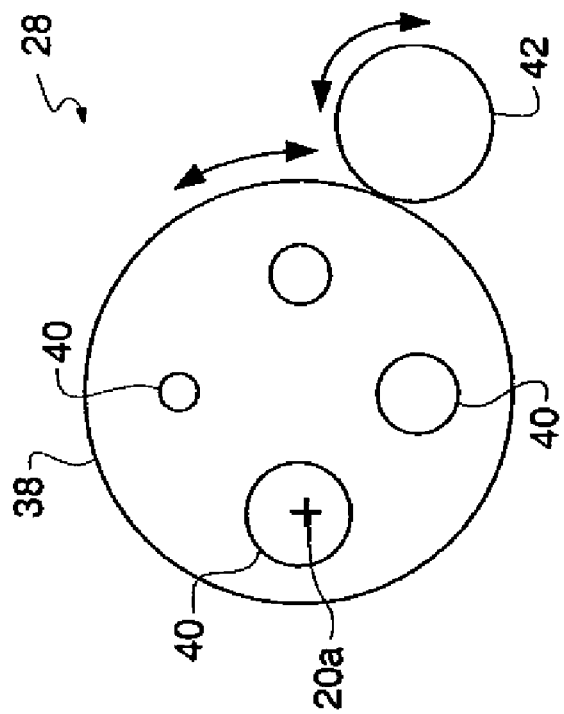
FIG. 4 is a diagrammatical front view of the diaphragm of the camera of FIG. 1.
Figure 3:
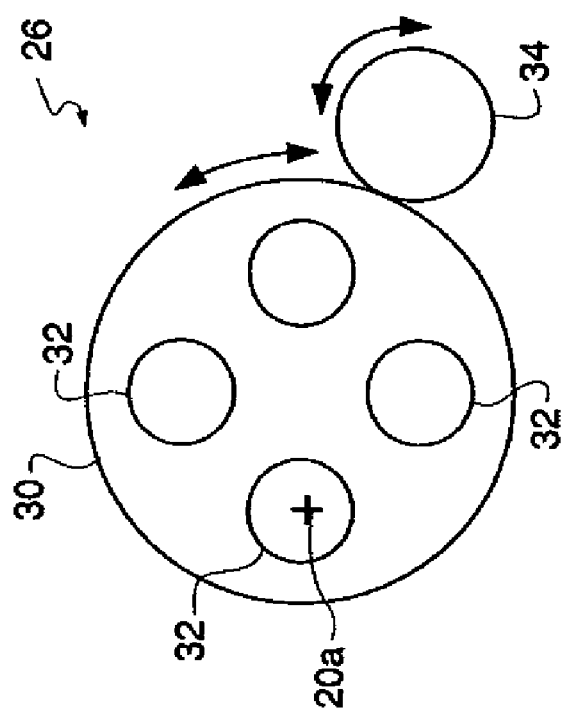
FIG. 3 is a diagrammatical front view of the filter wheel of the camera of FIG. 1.

In the illustrated camera, a filter assembly 26 and diaphragm 28 modify the light intensity at the sensor 18. Each is adjustable. The diaphragm 28 controls the intensity of light reaching the image sensor 20 using a mechanical aperture (not shown) to block light in the optical path 20. The size of the aperture can be continuously adjustable, stepped, or otherwise varied. As an alternative, the diaphragm 28 can be emplaceable in and removable from the optical path 20. Filter assembly 26 can be varied likewise. For example, filter assembly 26 can include a set of different neutral density filters that can be rotated or otherwise moved into the optical path. In FIG. 3, an example of the filter assembly 26 has a filter wheel 30 with different neutral density filters 32 that are rotatable into the optical path (illustrated by a cross 20a). The filter wheel 30 is directly driven by a driver 34, such as a stepper motor. In FIG. 4, an example of a diaphragm 28, in the form of a set of Waterman stops in a diaphragm wheel 38 is also illustrated. The differently sized apertures 40 of the diaphragm are rotatable into the optical path (illustrated by circle 20a) by a driver 42, such as a stepper motor. (Stepper motors are illustrated in FIGS. 3-4, as pinions meshed with the respective wheels. Directions of rotation are indicated by double-headed arrows.) Other suitable filter assemblies and diaphragms are well known to those of skill in the art.

The camera 10 has an optical system 44 that includes the taking lens 16 and can also include components (not shown) of a viewfinder 46. The optical system 14 can take many different forms. For example, the taking lens can be fully separate from an optical viewfinder or from a digital viewfinder that consists of an eyepiece provided over an internal display. The viewfinder lens unit and taking lens can also share one or more components. Details of these and other alternative optical systems are well known to those of skill in the art. For convenience, the optical system 44 is generally discussed hereafter in relation to an embodiment having a digital viewfinder and separate on-camera display 48 that can be also be used to view a scene, as is commonly done with digital cameras.

The taking lens 16 can be simple, such as having a single focal length and manual focusing or a fixed focus, but this is not preferred. In the camera shown in FIG. 1, the taking lens 16 is a motorized zoom lens in which a mobile element or elements are driven, relative to one or more other lens elements, by a zoom control-driver 50. This allows the effective focal length of the lens to be changed. Digital zooming (digital enlargement of a digital image) can also be used instead of or in combination with optical zooming. The taking lens can also include elements or groups (not shown) that can be inserted or removed from the optical path, by a macro control-driver 52 so as to provide a macro (close focus) capability.

The taking lens unit 16 of the camera 10 is also preferably autofocusing. For example, an autofocusing system can provide focusing passive or active autofocus or a combination of the two. Referring to FIG. 1, one of more focus elements (not separately shown) of the taking lens are driven, by a focus control-driver 54 to focus rays from a particular distance on the image sensor 20. The autofocusing system has a rangefinder 56 that has one or more sensing elements that send a signal to the control unit, which does a focus analysis of the signal and then operates focus driver 54 to move the focusable element or elements (not separately illustrated) of the taking lens 16.

Figure 5:
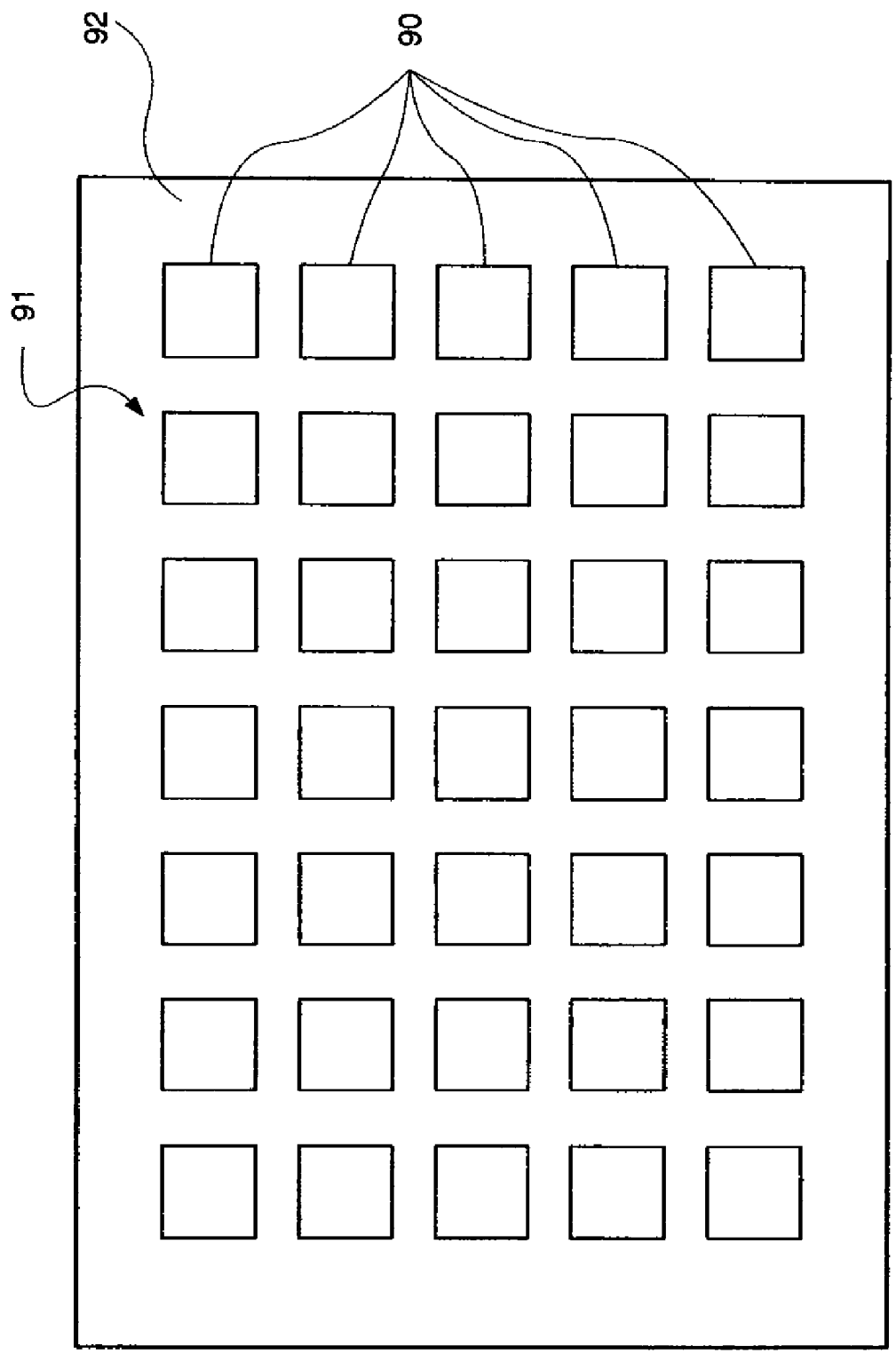
FIG. 5 is a diagram of the grid of regions formed by the sensors of the rangefinder of the camera of FIG. 1.

Referring now to FIG. 5, in particular embodiments, a rangefinder 56 of the camera 10 divides a transmitted image 92 of the scene into a grid 91 of regions 90 (illustrated as boxes in FIG. 5) and senses distances, for each region 90, to within the limits of one of several distance ranges. A wide variety of suitable multiple sensor rangefinders are known to those of skill in the art. For example, U.S. Pat. No. 5,440,369 discloses such a rangefinder. The rangefinder 56 then provides the distance range for each region 90 to the system controller 66, which then determines a subject-background pattern of the scene, as discussed below. The functions of the rangefinder can alternatively be provided as software and hardware functions of the capture unit and control unit (discussed below).

The camera 10 includes a brightness sensor 58. In FIG. 1, the brightness sensor 58 is shown as a one or more separate components. The brightness sensor 58 can also be provided as a logical function of hardware and software of the capture unit 14. The brightness sensor 58 has a driver that operates a single sensor or multiple sensors and provides at least one signal representing scene light intensity for use in the analysis of exposure of the scene. As an option, this signal can also provide color balance information. An example, of a suitable brightness sensor that can be used to provide one or both of scene illumination and color value and is separate from the electronic image capture unit 14, is disclosed in U.S. Pat. No. 4,887,121.

The camera of FIG. 1 includes a flash unit 60, which has an electronically controlled illuminator such as a xenon flash tube 61 (labelled "FLASH" in FIG. 1). A flash sensor 62 can optionally be provided, which outputs a signal responsive to the light sensed from the scene during archival image capture or by means of a preflash prior to archival image capture. The flash sensor signal is used in controlling the output of the flash unit by means of a dedicated flash controller 63 or as a function of the control unit. Alternatively, flash output can be fixed or varied based upon other information, such as focus distance. The function of flash sensor 62 and brightness sensor 58 can be combined in a single component or logical function of the capture unit and control unit.

The image sensor 18 receives a light image (the scene image) and converts the light image to an analog electronic image. The electronic image sensor 18 is operated by an image sensor driver. The electronic image is ultimately transmitted to the image display 48, which is operated by an image display controller-driver 64. Different types of image display 48 can be used. For example, the display 48 can be a liquid crystal display ("LCD") or an organic electroluminescent display ("OLED").

The control unit 65 controls or adjusts the exposure regulating elements and other camera components, facilitates transfer of images and other signals, and performs processing related to the images. The control unit 65 shown in FIG. 1 includes a system controller 66, timing generator 24, analog signal processor 80, an A/D converter 69, digital signal processor 70, and memory 72a-72d. Suitable components for the control system are known to those of skill in the art. These components can be provided as enumerated or by a single physical device or by a larger number of separate components. The controller 66 can take the form of an appropriately configured microcomputer, such as an embedded microprocessor having RAM for data manipulation and general program execution. Modifications of the control unit 65 are practical, such as those described elsewhere herein.

The timing generator 24 supplies control signals for all electronic components in timing relationship. Calibration values for the individual camera 14 are stored in a calibration memory (not separately illustrated), such as an EEPROM, and supplied to the controller 66. Components of a user interface (discussed below) are connected to the control unit 65 and function by means of a combination of software programs executed on the system controller 66. The control unit 65 also operates the drivers and memories, including the zoom driver 50, focus driver 54, macro driver 52, display drivers 64 and other drivers (not shown) for the shutter 22, diaphragm 28, filter assembly 26, and viewfinder and status displays 74,76.

The camera 10 can include other components to provide information supplemental to captured image information. An example of such a supplemental information component 78 is the orientation sensor illustrated in FIG. 1. Other examples include a real time clock, motion sensors, a global positioning system receiver, and a keypad or other entry device for entry of user captions or other information.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

The initial electronic image from the image sensor is amplified and converted from analog to digital by the analog signal processor 68 and analog to digital (A/D) converteramplifier 80 to a digital electronic image, which is then processed in the digital signal processor 70 using DSP memory 72a and stored in system memory 72b and/or removable memory 72c. Signal lines, illustrated as a data bus 81, electronically connect the image sensor 18, system controller 66, digital processor 70, the image display 48, and other electronic components; and provide a pathway for address and data signals.

"Memory" refers to one or more suitably sized logical units of physical memory provided in semiconductor memory or magnetic memory, or the like. Memory 72a-72d can each be any type of random access memory. For example, memory can be an internal memory, such as a Flash EPROM memory, or alternately a removable memory, such as a Compact Flash card, or a combination of both. Removable memory 72c can be provided for archival image storage. Removable memory can be of any type, such as a Compact Flash (CF) or Secure Digital (SD) type card inserted into a socket 82 and connected to the system controller 66 via memory card interface 83. Other types of storage that are utilized include without limitation PC-Cards or MultiMedia Cards (MMC).

The system controller 66 and digital signal processor 70 can be controlled by software stored in the same physical memory that is used for image storage, but it is preferred that the processor 70 and controller 66 are controlled by firmware stored in dedicated memory 72d, for example, in a ROM or EPROM firmware memory. Separate dedicated units of memory can also be provided to support other functions. The memory on which captured images are stored can be fixed in the camera 10 or removable or a combination of both. The type of memory used and the manner of information storage, such as optical or magnetic or electronic, is not critical. For example, removable memory can be a floppy disc, a CD, a DVD, a tape cassette, or flash memory card or stick. The removable memory can be utilized for transfer of image records to and from the camera in digital form or those image records can be transmitted as electronic signals.

Digital signal processor 70 is one of two processors or controllers in this embodiment, in addition to system controller 66. Although this partitioning of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor can perform all of the needed functions. All of these variations can perform the same function.

In the illustrated embodiment, digital signal processor 70 manipulates the digital image data in its memory 72a according to a software program permanently stored in program memory 72d and copied to memory 72b for execution during image capture. Digital signal processor 70 executes the software necessary for practicing image processing. The digital image can also be modified in the same manner as in other digital cameras to enhance images. For example, the image can be processed by the digital signal processor to provide interpolation and edge enhancement. Digital processing of an electronic archival image can include modifications related to file transfer, such as, JPEG compression, and file formatting. Metadata can also be provided in a manner well known to those of skill in the art.

System controller 66 controls the overall operation of the camera based on a software program stored in program memory 72d, which can include Flash EEPROM or other nonvolatile memory. This memory can also be used to store image sensor calibration data, user setting selections and other data which must be preserved when the camera is turned off. System controller 66 controls the sequence of image capture by directing the macro control 52, flash control 63, focus control 54, zoom control 50, and other drivers of capture unit components as previously described, directing the timing generator 24 to operate the image sensor 18 and associated elements, and directing digital signal processor 70 to process the captured image data. After an image is captured and processed, the final image file stored in system memory 72b or DSP memory 72a, is transferred to a host computer via interface 84, stored on a removable memory card 72c or other storage device, and displayed for the user on image display 48. Host interface 84 provides a high-speed connection to a personal computer or other host computer for transfer of image data for display, storage, manipulation or printing. This interface can be an IEEE1394 or USB2.0 serial interface or any other suitable digital interface. The transfer of images, in the method, in digital form can be on physical media or as a transmitted electronic signal.

In the illustrated camera 10, processed images are copied to a display buffer in system memory 72b and continuously read out via video encoder 86 to produce a video signal. This signal is processed by display controller 64 and/or digital signal processor 70 and presented on image display 48 and can be output directly from the camera for display on an external monitor. The video images are archival if the camera is used for video capture and non-archival if used for viewfinding prior to still archival image capture.

The camera has a user interface 88, which provides outputs to the photographer and receives photographer inputs. The user interface 88 includes one or more user input controls 93 (labelled "USER INPUTS" in FIG. 1) and image display 48. User input controls 93 can include a shutter release 94, a "zoom in/out" control 95 that controls the zooming of the lens units, and other user controls 96. User input controls can be provided in the form of a combination of buttons, rocker switches, joysticks, rotary dials, touch screens, and the like.

The user interface 88 can include one or more information displays 97 to present camera information to the photographer, such as exposure level, exposures remaining, battery state, flash state, and the like. The image display can instead or additionally also be used to display non-image information, such as camera settings. For example, a graphical user interface (GUI) can be provided, including menus presenting option selections and review modes for examining captured images. Both the image display and a digital viewfinder display can provide the same functions and one or the other can be eliminated. The camera can include a speaker, which provides audio warnings instead of, or in addition to, visual warnings depicted on the information display, image display 88, or both. The components of the user interface are connected to the control unit and function by means of a combination of software programs executed on the system controller 66.

Different types of image display 48 can be used. For example, the image display can be a liquid crystal display ("LCD"), a cathode ray tube display, or an organic electroluminescent display ("OLED"). The image display 48 is preferably mounted on the camera body so as to be readily viewable by the photographer.

As a part of showing an image on the image display, the camera can modify the image for calibration to the particular display. For example, a transform can be provided that modifies each image to accommodate the different capabilities in terms of gray scale, color gamut, and white point of the display and the image sensor and other components of the electronic capture unit. It is preferred that the display is selected so as to permit the entire image to be shown; however, more limited displays can be used. In the latter case, the displaying of the image includes calibration that cuts out part of the image, or contrast levels, or some other part of the information in the image.

It will also be understood that the camera herein is not limited to a particular feature set, except as defined by the claims. For example, the camera can include any of a wide variety of features not discussed in detail herein, such as, detachable and interchangeable lenses. The camera can also be portable or fixed in position and can provide one or more other functions related or unrelated to imaging. For example, the camera can be a cell phone camera or can provide communication functions in some other manner. Likewise, the camera can include computer hardware and computerized equipment. The camera can include multiple capture units.

Figure 18:
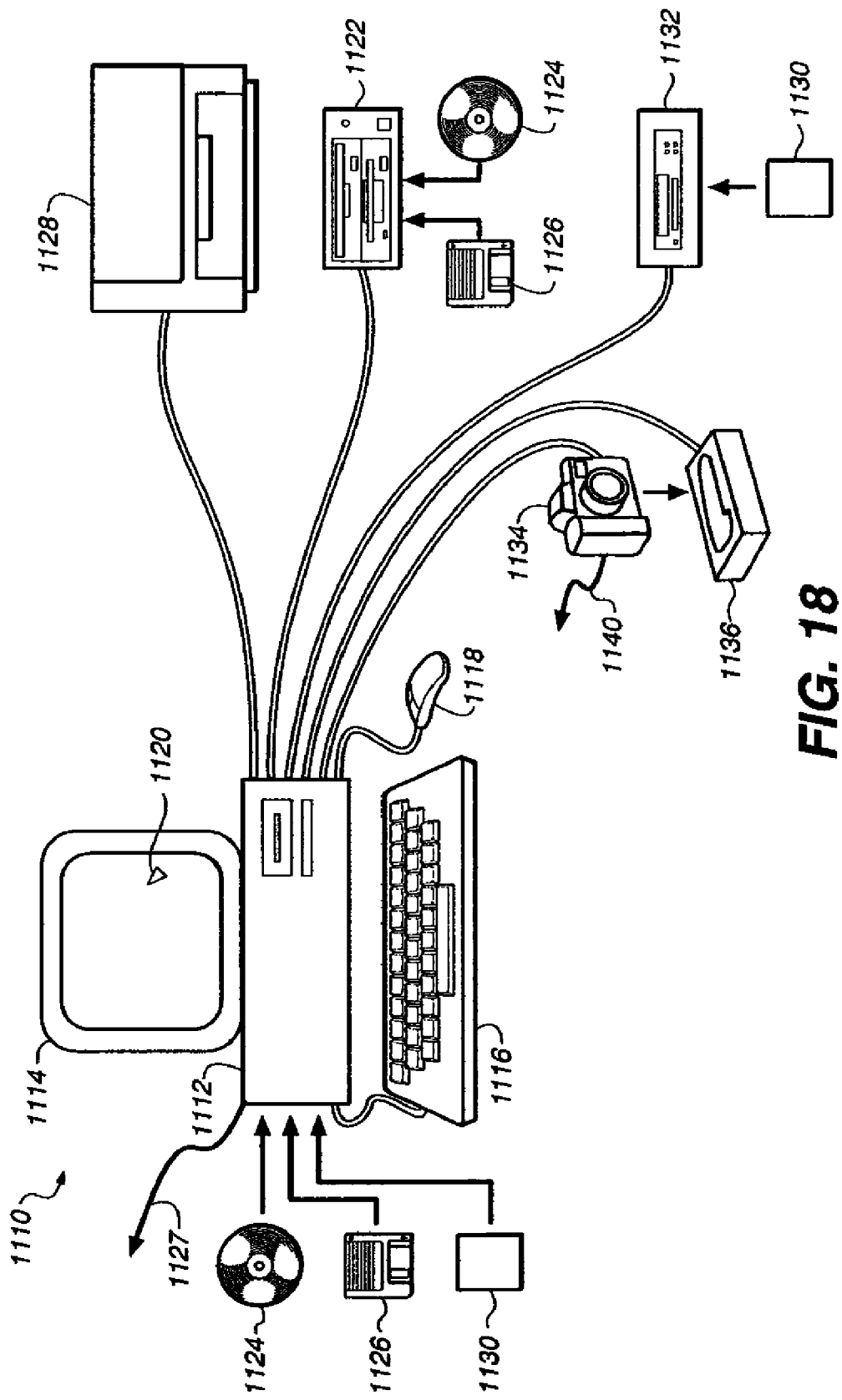
FIG. 18 is a diagrammatical view of an embodiment of the system.

For example, referring to FIG. 18, there is illustrated a camera in the form of a computer system 1110 and tethered capture unit. The camera can likewise be a portable computer, kiosks, or other system for the capture and processing of digital images. The computer system 1110 includes a microprocessor-based unit 1112 for receiving and processing software programs and for performing other processing functions. Images are input directly via a cable connection 1138 to the microprocessor-based unit 1112 or via a wireless connection 1140 to the microprocessor-based unit 1112.

A display 1114 is electrically connected to the microprocessor-based unit 1112 for displaying user-related information associated with the software, e.g., by means of a graphical user interface. A keyboard 1116 is also connected to the microprocessor based unit 1112 for permitting a user to input information to the software. As an alternative to using the keyboard 1116 for input, a mouse 1118 may be used for moving a selector 1120 on the display 1114 and for selecting an item on which the selector 1120 overlays, as is well known in the art.

Removable memory, in any form, can be included and is illustrated as a compact disk-read only memory (CD-ROM) 1124, which can include software programs, is inserted into the microprocessor based unit for providing a means of inputting the software programs and other information to the microprocessor based unit 1112. Multiple types of removal memory can be provided (illustrated here by a floppy disk 1126) and data can be written to any suitable type of removable memory. Memory can be external and accessible using a wired or wireless connection, either directly or via a local or large area network, such as the Internet. Still further, the microprocessor-based unit 1112 may be programmed, as is well known in the art, for storing software programs internally. A printer 1128 or other output device can also be connected to the microprocessor-based unit 1112 for printing a hardcopy of the output from the computer system 1110. The microprocessor-based unit 1112 can have a network connection 1127, such as a telephone line or wireless link, to an external network, such as a local area network or the Internet. One or more of the devices illustrated in FIG. 18 can be located remotely and can be connected via a network. One or more of the devices can be connected wirelessly, such as by an infrared or radio-frequency link, either directly or via a network.

The output device provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The microprocessor-based unit 1112 provides means for processing the digital images to produce pleasing looking images on the intended output device or media. The present invention can be used with a variety of output devices that can include, but are not limited to, a digital photographic printer and soft copy display. The microprocessor-based unit 1112 can be used to process digital images to make adjustments for overall brightness, tone scale, image structure, etc. of digital images in a manner such that a pleasing looking image is produced by an image output device.

In use, the camera is turned on and evaluation images are captured. The evaluation images are available for display by a digital viewfinder or the camera display for use in image composition. The evaluation images are captured in a continuous stream or sequence.

To take a picture with the camera, the shutter release is actuated by the user and trips from a set state to an intermediate state, and then trips to a released state. The separate stages are sometimes referred to as the "first stroke" and "second stroke", respectively. The intermediate state can be used, in a conventional manner, to lock in the settings of the current final capture state of the camera. Alternatively, the intermediate state can be eliminated. This is convenient for capture of video.

Figure 6:
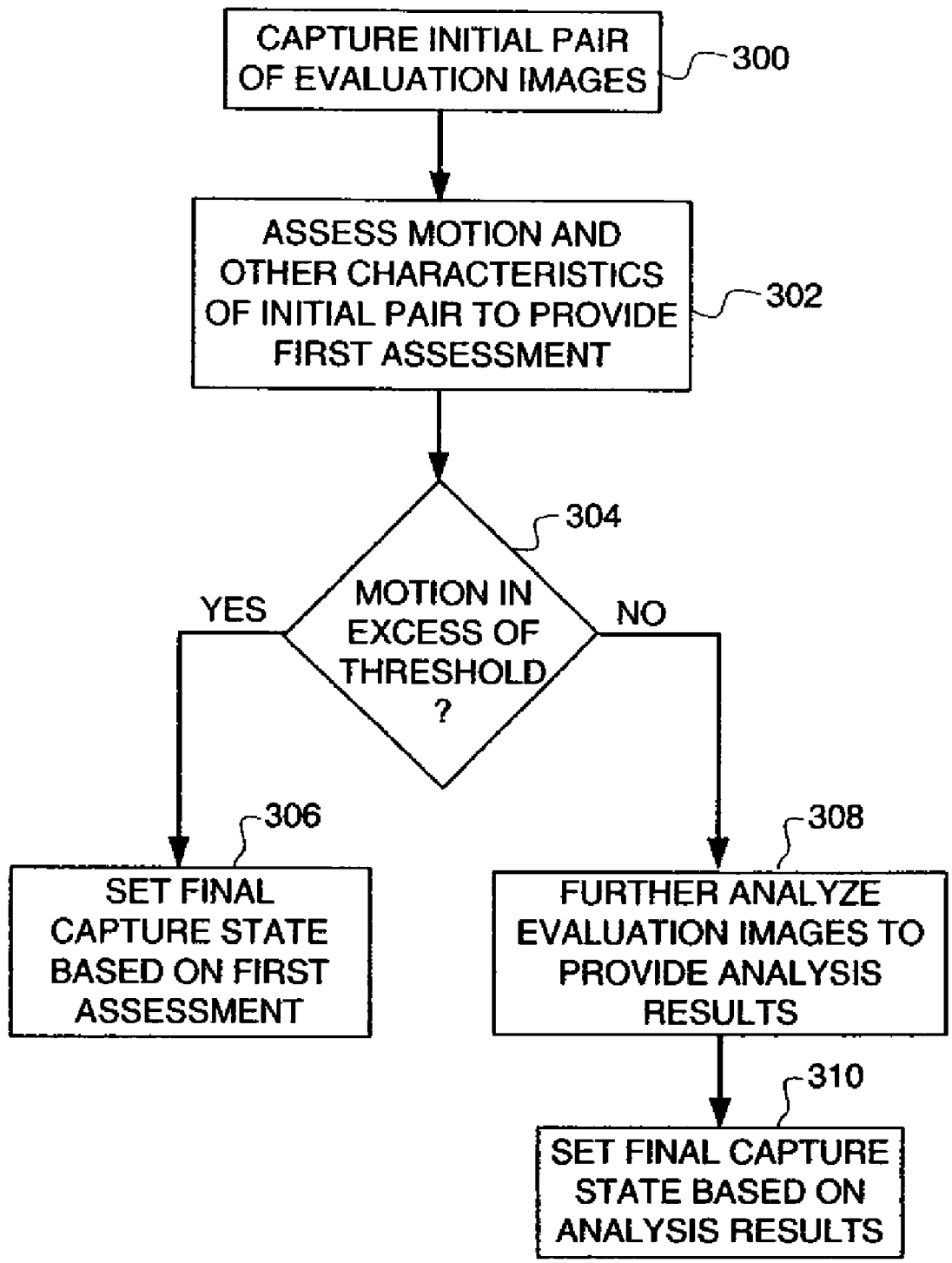
FIG. 6 is a flow chart of the steps of a method of evaluating subject motion in determining camera settings for image capture.
Figure 7:
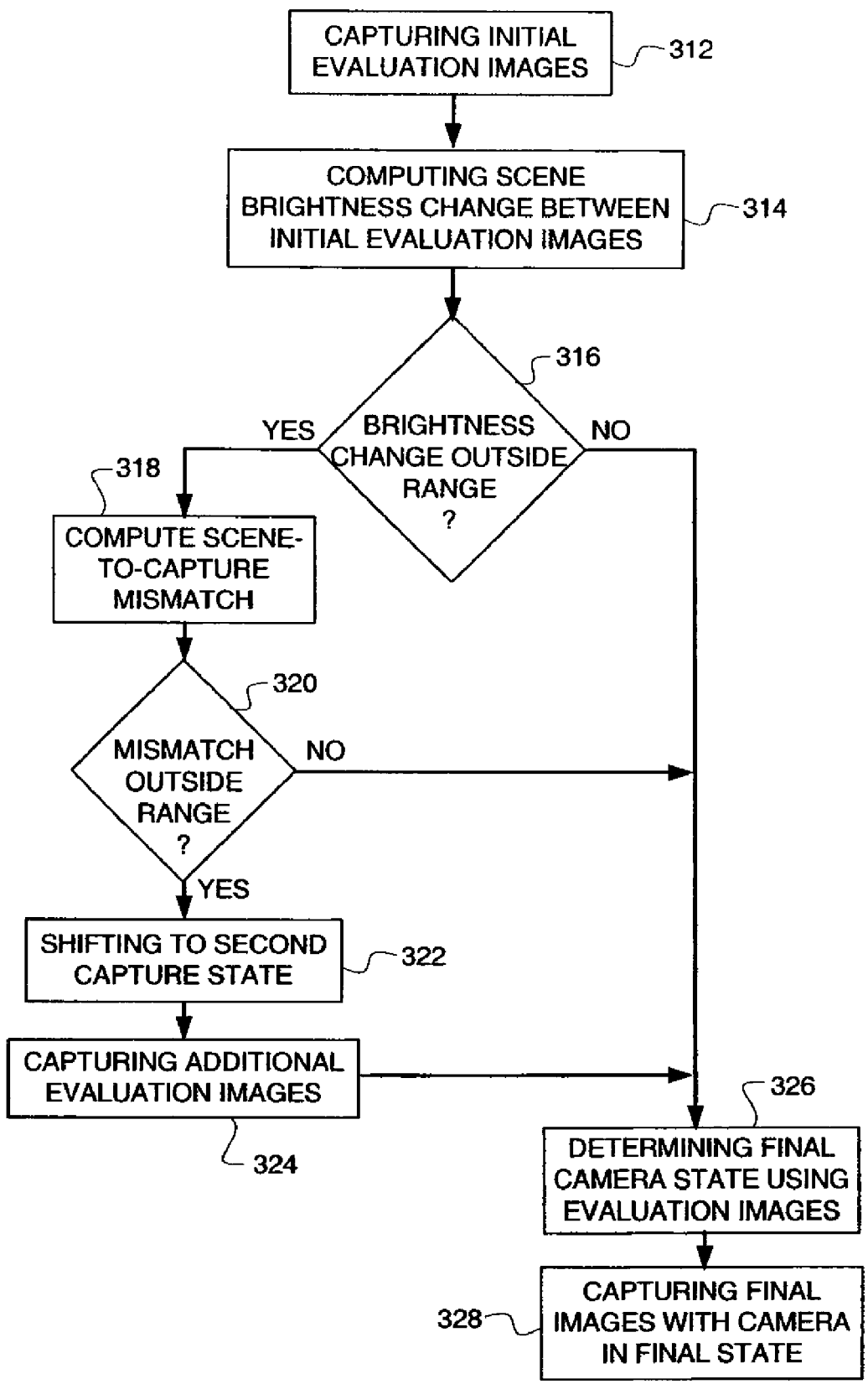
FIG. 7 is a flow chart of the steps of a method of considering brightness changes in determining camera settings for image capture.

In the methods, following the initiation of evaluation image capture, evaluation images and other camera data is considered by the control unit in determining the camera settings of a final image capture state for use in archival image capture. Subject motion and brightness changes between evaluation images can either of both be considered. FIGS. 6 and 7 present the general features of a method considering subject motion and a method considering brightness changes, respectively.

In the method of FIG. 6, an initial set of two or more evaluation images are captured (300) and a plurality of characteristics of that set are assessed (302) to provide a first assessment. It is highly preferred, to save time, that the initial set be limited to a pair of evaluation images and that the pair of images be successive images in the stream. The initial set of images can be at the beginning of the stream or at a later point in the stream during an iteration of the process. The characteristics assessed include subject motion between the two or more evaluation images of the initial set. Other characteristics assessed include brightness data and other information conventionally used for autofocus, autoexposure, and flash readying. These characteristics can be determined in relation to one or more of the evaluation images. The subject motion determination necessarily requires multiple images. Following the assessing, the motion assessed is compared (304) to a predetermined threshold. When the motion is in excess of the threshold, a final capture state is set (306) based on the first assessment. When the motion is not in excess of the threshold, a second assessment is conducted. In the second assessment, evaluation images are further analyzed (308) to provide analysis results and the final capture state is set (310) based on the analysis results. The threshold can be set heuristically. A simple example of a threshold is no subject motion found in the first assessment.

The second assessment can utilize one or more additional evaluation images of the sequence. It is currently preferred that the additional image or images are successive images and immediately follow the initial set, but a gap of unused evaluation images can exist between the initial set and the additional images. The number of additional images is a matter of convenience and processing constraints, in view of time requirements. It is desirable that the final capture state be set without a noticeable delay in final image capture or with only a slight delay.

In the second assessment, characteristics of the additional one or more images are determined. Both assessments are then analyzed and the final capture state is set responsive to the analyzing. This necessarily consumes more time than the first assessment alone. The final capture state following the analyzing, in many cases, will differ from the final capture state earlier determined based on only the first assessment in values of one or more of focal length, focus distance, aperture, exposure time, and gain.

The characteristics determined in the second assessment can be the same as those of the first assessment, including subject motion, or can vary. Additional characteristics that are more computationally intensive than those of the first assessment, can also be considered. The second assessment can include consideration of depth of field and tonality, as discussed below in detail.

The term "tonality" is used herein to refer to the overall grey scale or tone scale of the densities of regions of an image with respect to the effectiveness of the values in representing the grey scale or tone scale of the subject of the image. A binary representation of a color subject has low tonality.

The characteristics in the first and second assessments are limited by processing constraints. The processing provided in the first assessment is more limited than in the second assessment, but, if undue delay is not incurred, one or both of the assessments can include more complex determinations such as determinations of semantic features, such as locations, depth of field, and other features of faces.

In the method of FIG. 7, initial evaluation images are captured (312). The camera, is initially in a default state, which can be preset or based upon currently measured parameters, such as detected scene brightness. A change in scene brightness between two or more of the initial evaluation images is computed (314). The brightness change has possible values with magnitudes from zero or unmeasurable change to a maximum measurable by the camera. The scene brightness change is compared (316) to a predetermined scene brightness range that is intermediate relative to the possible values of brightness change. When the scene brightness change is outside the predetermined scene brightness range, a scene-to-capture mismatch is computed (318). This mismatch is an estimate that is based upon characteristics of the image (also referred to herein as "markers") that are indicative of a failure of the camera to capture one or more aspects of the light image of the scene. The mismatch can be in the form of a metric.

The mismatch is compared (320) to a predetermined mismatch range. When the mismatch is outside the mismatch range, the camera is shifted (322) to a second capture state and additional evaluation images are captured (324). When the scene brightness is in the scene brightness range or the mismatch is in the mismatch range, the capture of additional evaluation images is skipped. A final capture state is determined (326) using the available evaluation images and final images are captured (328) with the camera in the final capture state.

In a particular embodiment, each evaluation image has associated depth of field information and corresponding distance range information. In that case, markers for one or both of depth of field problems and tonality accumulation can be evaluated. The computing of the mismatch for depth of field problems assesses differences between the distance range information and the depth of field information. Tonality accumulations are considered in relation to highlights (brightest pixels in an image) and shadows (darkest pixels in the image). A tonality accumulation in a captured image is a zone of shadow or highlight having a narrow or single step tone scale, rather than a broader multi-step tone scale characteristic of other parts of the image. Tonality accumulation is indicative of information loss relative to a corresponding light image of a scene and the available tone scale of a particular capture system. The characteristics of tonality accumulations are well known to those of skill in the art and can be readily determined heuristically for a particular camera.

When the brightness change is in the predetermined brightness range or when the mismatch is in a predetermined range, the camera is maintained in an initial capture state during the capturing of all of the evaluation images. When the brightness change and mismatch are outside respective ranges, the camera is shifted to a second capture state prior to the capturing of one or more additional evaluation images. The second capture state is at least partially corrective of the mismatch. For example, the additional evaluation images can be focused to provide a depth of field that better matches distances to subject matter determined by the rangefinder. In another example, a second capture state can change exposure to provide better tone scale in highlights or in shadows.

After the evaluation images are captured and analyzed, a final camera state is determined using the set of evaluation images. Each of the capture states includes settings of a plurality of: focal length, exposure time, focus distance, aperture, white balance adjustment, and flash state. One or more final images are then captured with the camera in the final camera state.

The steps leading to capture of the final images can be free of user intervention other than an initial actuation of evaluation image capture and a tripping signal actuating final image capture. Alternatively, the camera can display an indication of the mismatch to the photographer prior to the setting of the final capture state and accept user input designating one of a plurality of capture states as the final capture state. The indications can be evaluation images captured when the camera was in the second capture state. For example, the camera can display an indications of a capture state that would decrease tonality accumulations in shadows and indication of another capture state that would decrease tonality accumulations in highlights. Similarly, the camera can display evaluation images captured with different depths of field.

Figure 8:
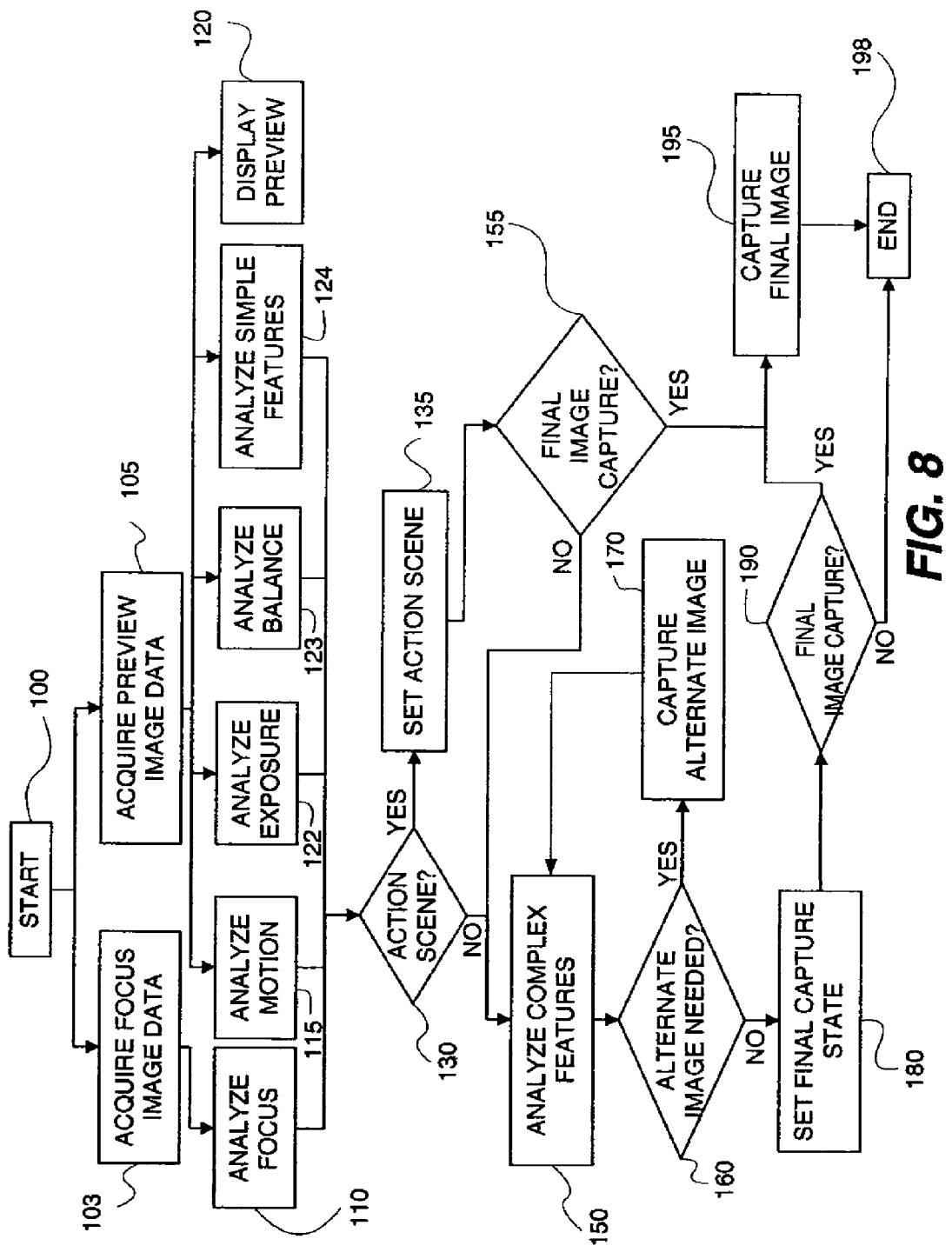
FIG. 8 is a detailed flow diagram of an embodiment incorporating the methods of both FIG. 6 and FIG. 7.
Figure 9:
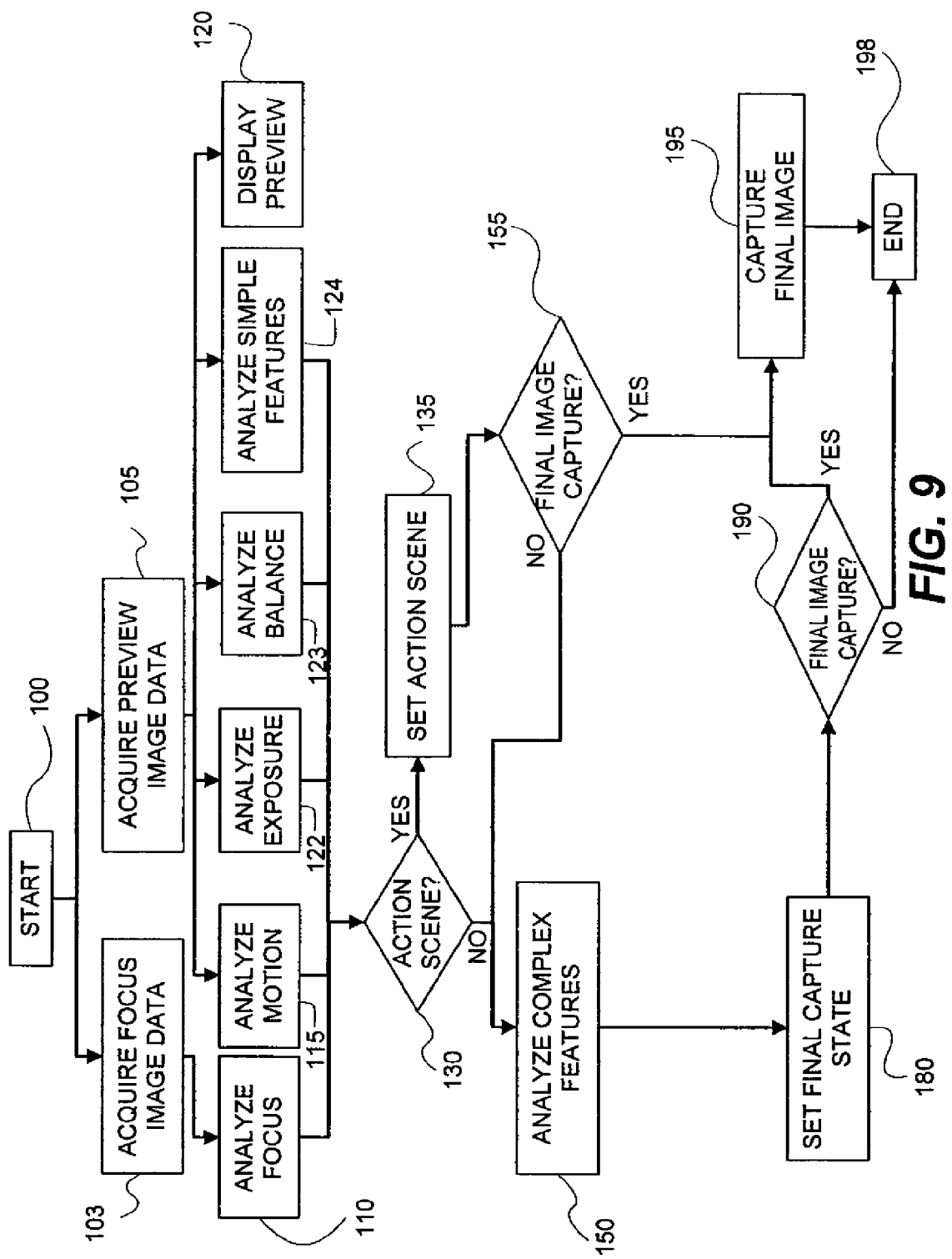
FIG. 9 is a detailed flow chart of a modification of the method of FIG. 8, which is limited to the method of FIG. 6.
Figure 10:
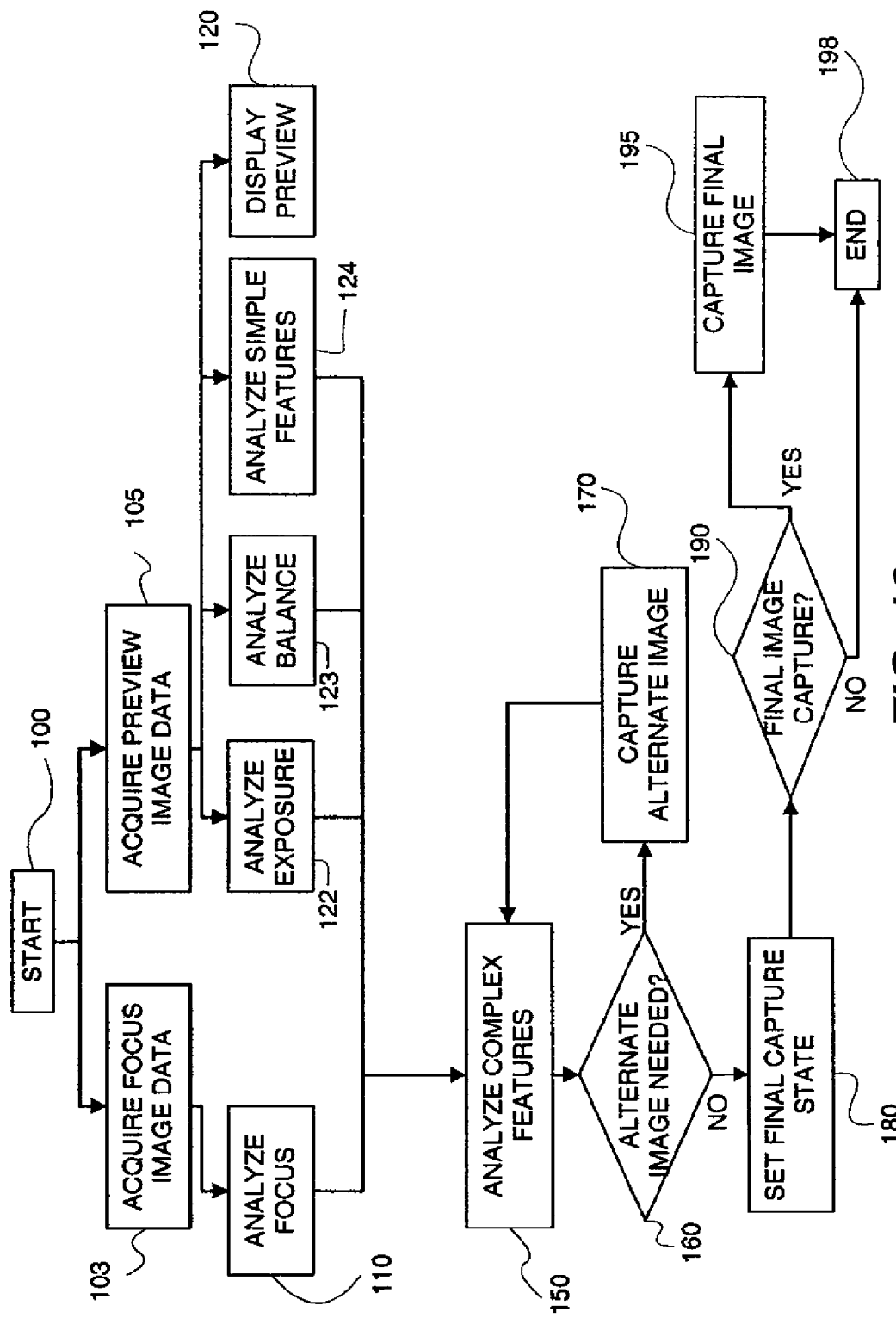
FIG. 10 is a detailed flow chart of a modification of the method of FIG. 8, which is limited to the method of FIG. 7.

FIG. 8 presents a detailed flowchart of a particular embodiment incorporating the methods of both FIG. 6 and FIG. 7. FIG. 9 presents a modification of the method of FIG. 8, in which subject motion is not considered. FIG. 10 presents another modification of the method of FIG. 8, in which brightness changes are not considered.

In FIG. 8, the overall decision flow is essentially a continuous loop, from start block 100 to end block 198 and back to start 100, with an occasional branch for capture of a final still image. In this embodiment, evaluation images are captured in a continuous stream and are continuously analyzed in the evaluation cycle of FIG. 8, when the camera is active and the user is composing the scene prior to actuating the shutter release. The evaluation images can be at a lower resolution than the final image.

Processing begins at the top of FIG. 8, at start block (100). Next, focus image data is acquired (103) and preview image data is acquired (105). In both cases, the image data is supplied by two or more evaluation images. The focus data includes lens focus distance information and a specialized image that can be analyzed for local contrast (edge content).

The focus data can be produced by performing edge enhancement of one or more of the evaluation images. The preview image data is the image data of two or more of the evaluation images or subsampled versions of those images. For convenience, in the following discussion the preview image data is treated as being the respective evaluation images. It will be understood that like considerations apply to subsampled or otherwise modified images.

Following the acquisition of focus data, the autofocus (AF) analysis operation is performed (110). Focus image data from the image sensor is filtered with band pass and high pass filters to produce local contrast values. The local contrast values, along with the lens focus distance, are analyzed to provide an understanding of the subject matter distance of one or more of the evaluation images. The focus image data can include information, such as lens focus distance and local contrast values, retained from previous iterations of the evaluation cycle. Lens focus distance can be changed between cycles using the lens focus control 54. Focus determination procedures using such information, sometimes referred to as a "through-focus" approach, are well known to those of skill in the art. The result of this analysis is effectively a range map of best focus distance for different portions of the scene.

The focus image data can additionally or alternatively include range information from a rangefinder in addition to or instead of image sensor information. The range information provided by the rangefinder 56 of the camera of FIG. 1 is in the form of a range map. Through focus and rangefinder approaches are only two options among many for acquiring a map of distances to different portions of the scene. Other approaches can also he used.

Display images for presentation (120) on the display are prepared from the evaluation images. One or more operations may be required for conversion of the evaluation images into display images. Conversion includes such procedures as resizing, balancing, and color correcting the image for display on the image display.

Subject motion analysis is also performed (115) on the evaluation images. The current evaluation image is compared to the previous evaluation image, determining what subject motion has occurred between the two images. Typical intentional camera movements are low frequency, no more than 1-2 Hz, while hand tremor commonly occurs at 2-10 Hz. Thus, low-pass temporal filtering can be applied to the motion estimates to distinguish deliberate motions from high frequency jitter. Many procedures are known for motion estimation.

U.S. Pat. Nos. 6,130,912 and 6,128,047 disclose the use of integral projection for motion estimation. A block-based motion estimate is disclosed in "Efficient Block Motion Estimation Using Integral Projections", K. Sauer and B. Schwartz, *IEEE Trans. On Circuits and Systems for Video Technology,* 6(5), 1996, pages 513-518. The integral projections are within a block-matching framework and are subject to the limitations of block based techniques. The use of full image integral projections in computing a global expansion of a block-based motion estimate is disclosed in "Real-time Digital Video Stabilization for Multi-media Applications", K. Ratakonda, *IEEE Int'l Symposium on Circuits and Systems,* 1998, vol. 4, pages 69-72.

Figure 14:
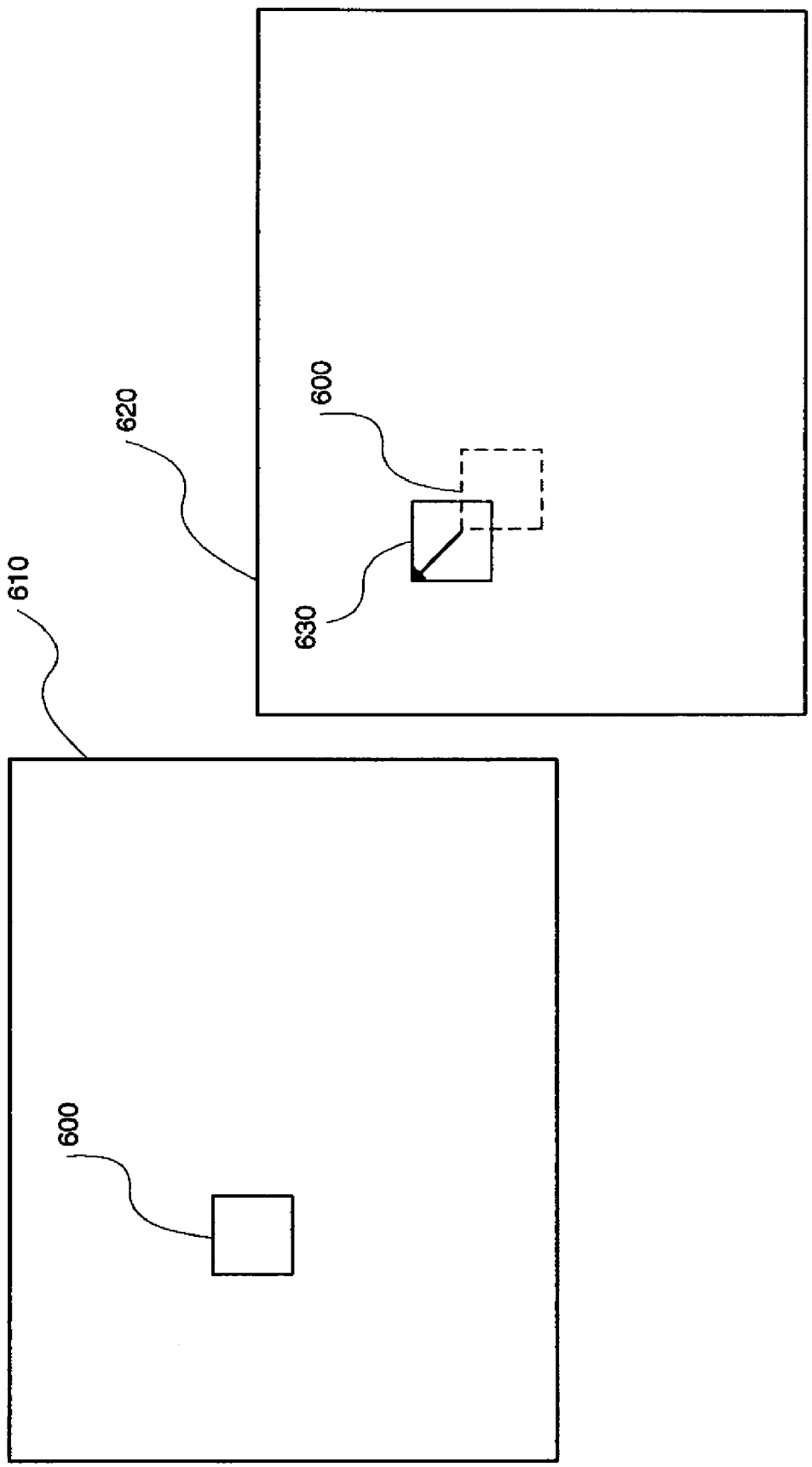
FIG. 14 illustrates block-based motion analysis in a modification of the camera of FIG. 1.

One procedure using of block-based motion analysis as illustrated in FIG. 14. An evaluation image 610 has a block of pixels 600 within it, defining a rectangular zone of interest within the evaluation image. The previous evaluation image 620 is searched for a block of pixels matching the block of pixels in block 600. In this example, the block of pixels in image 620 that matches best is block 630. Accordingly, the vector from the corner of block 600 to the corner of block 630 is the estimated motion vector for this block of pixels. This process is repeated for multiple blocks of pixels in evaluation image 610 and previous evaluation image 620, developing a set of motion estimates for different regions of the scene. If block-based motion estimation is used, it is desirable to implement techniques to reject blocks that likely provide spurious motion estimates. Such techniques are known to those of skill in the art. If computational resources allow, even more complex motion analysis, such as those involving segmentation of moving objects, can be used to advantage.

In a particular embodiment, motion estimation is based on integral projection. This approach is relatively efficient. Block-based techniques, especially ones using blocks that are similar in size to those used for video compression, can pick up finer motion than would be easily detectable using projection techniques, but require more computing resources. Referring to FIGS. 16A-17B, horizontal and vertical image projection vectors are formed by summing the image elements in each column to form horizontal projection vectors, and summing the elements in each row to form vertical projection vectors.

Figure 16B:
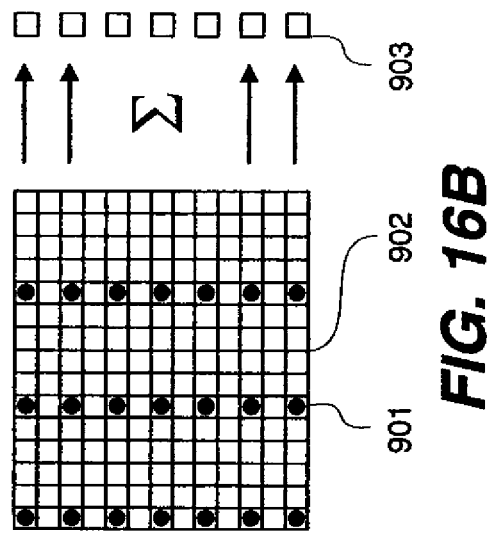
FIGS. 16A-16B are diagrammatical views of the summation of data within rows to form vectors used in the motion analysis of the camera of FIG. 1.
Figure 16A:
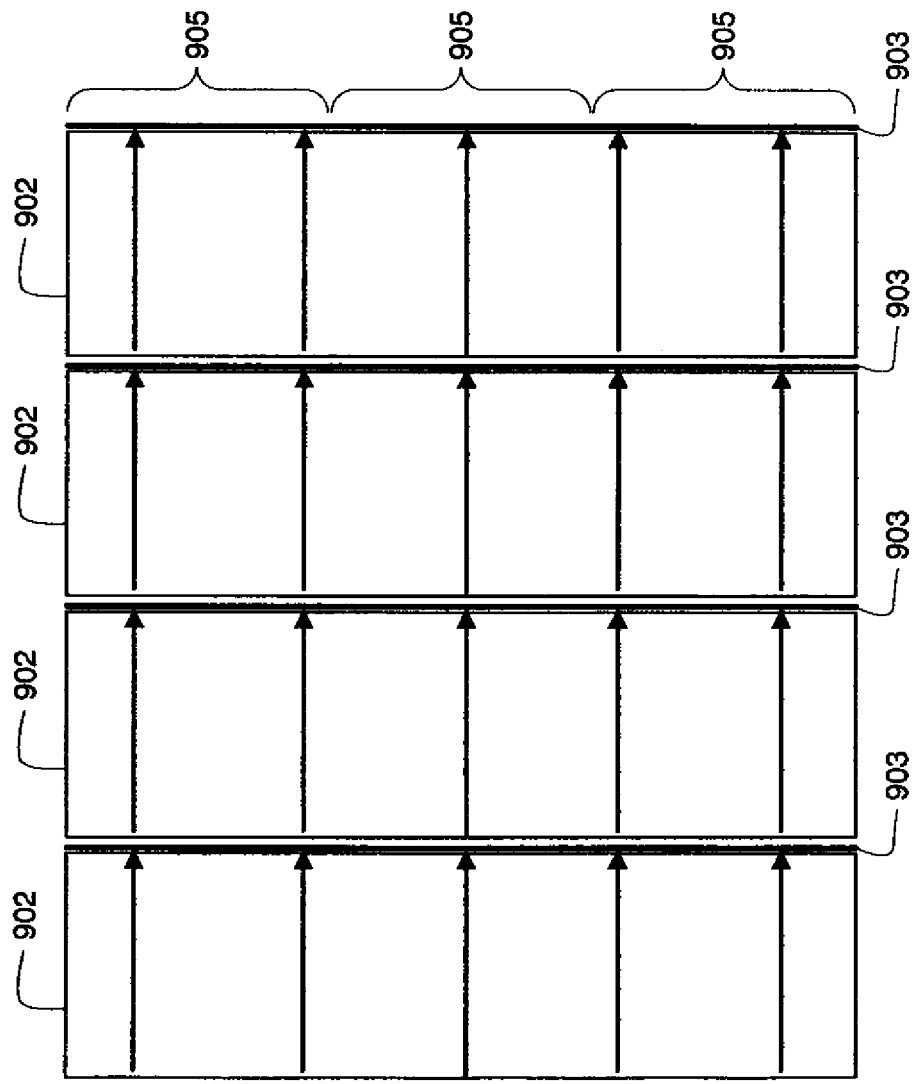

In FIG. 16A, a captured evaluation image is shown broken into four vertical bands 902. Pixels in each of these bands 902 are summed into projection vectors 903. FIG. 16B shows an expanded view of this process. The vertical projection vector 903 is formed by summing various data points 901 within the overall Y component image data for band 902. In the illustrated embodiment, only a subset of the image data is used when forming the vertical projection vector. In FIG. 16B, only every fifth pixel of each row of the image data is included in the summation. Additionally, only every second row is considered in the summation and creation of projection vector 903. As shown in FIG. 16A, several vertical projection vectors 903 are formed from multiple bands of the image 902. For simplicity, these bands do not overlap, though as the number of bands is increased, there can be an advantage to allowing some overlap. During analysis, segments 905 of each projection vector are analyzed. Dividing the evaluation image into bands and segments allows multiple motion estimates for each pair of evaluation images analyzed.

In FIG. 17A, a captured evaluation image is shown broken into three horizontal bands 952. Pixels in each of these bands 952 are summed into projection vectors 953. FIG. 17B shows an expanded view of this process. The horizontal projection vector 953 is formed by summing various data points 951 within the overall Y component image data for band 952. In the illustrated embodiment, only a subset of the image data is used when forming the horizontal projection vector. In FIG. 17B, only every fourth pixel of each column of the image data is included in the summation. Additionally, only every second column is considered in the summation and creation of projection vector 953. As shown in FIG. 17A, several horizontal projection vectors 953 are formed from multiple bands of the image 952. For simplicity, these bands do not overlap, though as the number of bands is increased, there can be an advantage to allowing some overlap. During analysis, segments 955 of each projection vector are analyzed. Dividing the evaluation image into bands and segments allows multiple motion estimates for each pair of evaluation images analyzed.

Much of the burden of estimating motion via integral projections resides in the initial computation of the projection vectors. If necessary, this complexity can be reduced in two ways. First, the number of elements contributing to each projection sum can be reduced by subsampling as shown in FIGS. 16B and 17B. A second subsampling can be achieved by reducing the density of the projection vectors as shown in FIGS. 16B and 17B. For example, when forming the horizontal projection vector, including only every other column in the projection vector. This type of subsampling reduces complexity even more because it also decreases the complexity of the subsequent matching step to find the best offset, but it comes at a cost of reduced resolution for motion estimates.

The subset of imaging data to be used for the horizontal and vertical projection vectors can be selected heuristically, with the understanding that reducing the number of pixels reduces the computational burden, but also decreases accuracy. For accuracy, it is currently preferred that total subsampling reduce the number of samples by no more than a ratio of 4:1-6:1. Further, if resources are available, it is preferred to not subsample at all in creating the projection vectors.

The use of multiple partial projection vectors rather than full image projection vectors reduces the effect of independently moving objects within images on the motion estimate. The number of partial projection vectors in each direction need not be large for good results. For example, in a particular embodiment shown in FIGS. 16A and 17A, 12 horizontal and 12 vertical motion estimates are obtained. That is, vertical motion estimates are obtained for three segments 905 of each vertical projection vector 903. Similarly, horizontal motion estimates are obtained for four segments 955 of each horizontal projection vector 953.

FIGS. 15A-15B illustrate comparing the corresponding partial projection vectors between corresponding partial areas of two images. Given length M horizontal projection vectors, and a search range of R pixels, the partial vector 801 of length M-2R from the center of the projection vector for image n-1 is compared to partial vectors from image n at various offsets 802, 803. The comparison yielding the best match is chosen as a best motion estimate in the respective direction. The best match is defined as the offset yielding the minimum distance between the two vectors being compared. Common distance metrics include minimum mean absolute error (MAE) and minimum mean squared error (MSE). In a particular embodiment, the sum of absolute differences is used as the cost function to compare to partial vectors, and the comparison having lowest cost is the best match.

The search for lowest cost offsets for each segment is conducted with segments of the original projection vectors, simply checking the match for each offset in a given range (such as offsets -10, -9, -8, ... -1, 0, 1, 2, 3, ... 8, 9, 10). This requires computing a given number of MAE values, such as 21 in this example.

An approach that saves computing power is to conduct a two-stage hierarchical search. The simplest approach is to conduct a first-stage search with only a subset of offsets (such as -10, -8, -6, ... 0, 2, ... 8, 10). Once an offset is found that provides the best match in the sparse search, several additional offsets are checked around that minimum to determine the precise offset resulting in the minimum cost.

After horizontal and vertical offsets for each segment and band are determined, further analysis of the motion estimates and costs allows discrimination between still scenes and scenes with a high degree of action. The mean of the absolute values of the valid offset estimates provides one indication of scene activity. This indicator correlates with global motion and camera motion. A second indicator of scene activity is the range of valid offset estimates, which correlates more closely with motion in portions of the scene. A third indicator used in the particular embodiment is the average of the cost values corresponding to the valid offset estimates.

Integral projections can fail as a motion estimation technique under various conditions. For several conditions, failure can be mitigated by requiring motion estimate components to exceed heuristically predetermined minimum value.

A failure condition can occur when the scene contains a repeated pattern, such that multiple different motion estimates yield similar costs. This case can be identified by ascertaining not only the best motion estimate, but also the second and third best motion estimates. Under normal circumstances, these three best motion estimates will be clustered together. If the difference between them is greater than a predetermined value, then a repeated pattern may be present. In that case, the motion estimate closest to zero can be selected. As an alternative, the cost function, such as MAE, can be scaled by a simple function of magnitude of the motion estimate. The cost for each motion estimate is increased by a simple function of the magnitude of the estimate, such as the following equation:

$$C_m = C \times f \times |O|$$

In this equation, O is the (signed) offset or motion estimate, f is a value that would typically range from 1.0 to 1.2, C is the usual cost function, and $C_m$ is the final modified cost function. This scaling process increases the cost value as the offset moves away from zero. Several local minima in the cost function will be scaled by different values because they are located at different offsets. If there is only one global minimum, this scaling function has little effect, because the change in cost scaling for a unit change in offset is slight.

Another condition that can cause motion estimation to fail is a portion of a scene having very little local contrast. In this case, all motion estimates have similar accuracy, and the best offset can be determined incorrectly due to noise. This case can be identified by tracking the average cost of all motion estimates, as well as tracking the best cost. If the ratio between the average cost and the best cost is too small, that suggests a scene region with little content and the respective motion estimates are flagged as invalid.

A similar failure occurs when a smooth gradient exists in the scene. In this case, exposure and other differences can easily be confused with scene motion. To resolve this, checks can be made for changes in the sign of the first derivative in the projection vector segment from the current image. Since taking a derivative is a noisy process and only larger changes are of interest, the projection vector segment values can be scaled down prior to taking the first derivative. Projection vector segments that have too few changes in the first derivative can be omitted from the motion estimation.

Another situation that can result in integral projection failure is exposure change from one image to the next. This situation can be addressed by summing the values in the integral projection vectors to obtain an overall intensity value for each vector. These values can be used to adjust the projection vectors prior to evaluating the various motion estimate offsets.

For the current purpose, discrimination between camera motion and motion within the scene is desirable but not critical. Clearly distinguishing between camera motion and motion within the scene allows for more intelligent behavior when the user is panning the camera. Being able to discount motion due to deliberate camera panning allows better analysis of motion of the main subject. For example, a capture of a race car with the camera being held steady can be optimized slightly differently than capture of the same race car when the user is carefully panning with the race car. In the second case, a longer exposure time would be in order to emphasize the blur in the background. Camera motion can be detected by use of one or more motion sensors.

At the same time, casual photographers rarely pan a camera in a highly controlled way. For these users, camera motion often correlates with high amounts of jitter and large amounts of motion within the scene. Thus, even limited intelligence that identifies significant motion, whether from camera motion or from scene motion, is of value in improving most image capture scenarios.

Exposure analysis (AE) 122 is also performed. The objective of the analysis is to estimate the optimum exposure for the main subject of the evaluation image. A variety of techniques are well known to those of skill in the art. For example, a simple approach is to place the middle of an exposure range at the mean or median of a group of pixels corresponding to the nearest subject detected by a rangefinder. Other exposure analysis techniques average the brightness of different portions of the scene with different weighting factors. The weighting factors are based on secondary attributes such as pixel clipping, color saturation, proximity to edges in the scene, and other factors. The exposure analysis is used to control the exposure of the next evaluation image and to control the exposure of a final image.

White balance (AWB) analysis 123 is also performed. The objective of this analysis is to determine the best set of red, green, and blue balance gains to provide an appropriate neutral balance for the evaluation image. A variety of techniques are also well known in the art. A simple technique computes adjustments of red, green, and blue gains of all of the pixels of the image to provide a neutral balance. Other techniques compute the color balance for different portions of the scene and compute an average balance for the overall scene using weighing factors for each portion of the scene. The weighing factors depend on attributes of the image, such as lightness, color saturation, and proximity to detected edges in the scene.

Simple feature analysis 124 is also performed on the evaluation image. The simple feature analysis 124 complements the other (AE, AF, AWB, motion) analyses 110, 115, 122, 123 and, together with analyses 110, 115, 122, 123 provides the first assessment. The simple feature analysis 124 has moderate computational demands. It is preferred that the simple feature analysis 124 and other analyses of the first assessment reach completion within the refresh frame time defined by a refresh of the camera image display. In a particular embodiment, this time limit is 30 milliseconds. For clarity, the analysis blocks 110, 115, 122, 123, and 124 are shown separately. In fact, there are advantages to combining aspects of the analyses and the precise functions can be mixed and combined.

One example of simple feature analysis is skin detection (skin color region detection). The use of camera metadata alone, such as focus distance, focal length and scene brightness, to identify portrait scenes results in a high number of false positive portrait classifications. This happens when scenes do not contain portrait of people but are captured under conditions similar to those used for capturing portraits. For example, if an object such as a bookcase is captured from a distance of about 1 meter, an algorithm based solely on focus distance, focal length and scene brightness is likely to classify the scene as a portrait due to the fact that the image capture parameter settings are likely to resemble those used during the capture of a portrait. In this case, the scene is not a portrait.

The accuracy with which portrait scenes can be differentiated can be improved if the presence of skin data in the scene is taken into account during scene classification along with other information, such as information provided by focus, exposure, and balance analysis. A scene containing one or more people that has been composed to include the head and shoulders, is likely to contain a significant proportion of skin content. The presence of skin pixels in the scene can be used as indication that a portrait type scene is being captured. Any skin detection algorithm can be used to detect skin pixels during composition. In a particular embodiment the skin detection method is the method of 'Bayesian decision rule for minimum cost' Jones and Rehg, "Statistical Color Models with Application to Skin Detection", *International Journal of Computer Vision*, vol. 46, no. 1, January 2002).

A pixel, x, is considered as skin if:

$$\frac{p(x \mid \text{skin})}{p(x \mid \text{nonskin})} \geq \tau$$

where: x is a pixel color triple, preferably a YCC triple, p(x|skin) is a 3D conditional probability density function of skin, and p(x|nonskin) is a 3D conditional probability density function of non-skin.

(A probability density function is also referred to herein as a "PDF".) The variable $\tau$ is a predetermined skin detection threshold. For a pixel triple, x, the conditional PDF of skin, p(x|skin), returns a value that describes the probability that x is a skin pixel. A large value indicates a high probability that x is a skin pixel and a small value indicates a low probability that x is skin. Likewise, the conditional PDF of non-skin, P(x|nonskin) returns a value for x that describes the likelihood that x is a non-skin pixel. A large value indicates a high probability that x is any pixel other than skin and a small value indicates a low probability that x is a non-skin pixel.

To determine a skin PDF, a 3D skin histogram can be predetermined using known (ground-truth) skin pixel data, preferably in the YCC color space, although any three-color space can be used. The ground-truth skin pixel data can be generated manually by selecting skin pixels from images containing skin data. If desired for greater accuracy, the images used for ground-truth data can be evaluation images from the same camera or same type of camera. The skin histogram is converted to a skin PDF by dividing the value in each bin, by the maximum value in the histogram, although the total count in the skin histogram can be used. Likewise, a non-skin PDF can be determined from a 3D histogram of non-skin pixels. The non-skin histogram is converted to a non-skin PDF using the same method employed for the skin PDF. It is preferred that the skin and non-skin PDF's are applied as 3D look-up tables (LUT's) with $32^3$ bins, although any other bin resolution can be used, such as $64^3$ or $128^3$.

To reduce the memory requirements associated with storing the skin and non-skin LUT's in a digital camera, it is possible to combine the LUT's into a single 3D LUT where the bit depth of each element of the LUT is 8 bits, although any other bit depth may be used. To combine the skin and non-skin PDF LUT's, all bin values in the non-skin PDF LUT that are less than a predetermined threshold, such as 0.00061, are set equal to that threshold value, creating the PDF p(x|nonskin)'. Each value in the skin PDF LUT is divided by the value in the corresponding non-skin LUT according to the equation:

$$p(x \mid cskin) = \frac{p(x \mid \text{skin})}{p(x \mid \text{nonskin})'}$$

For convenience in storage, the resulting PDF is quantized to 256 levels. A pixel x can be considered as skin if:

$$p(x|cskin) \geq \tau$$

where p(x|cskin) is the combined skin and non-skin PDF. A further saving in memory can be obtained if only non-zero values in the LUT are stored. Other techniques can be used to optimize storage and access techniques, such as storing only PDF values for a restricted range of index values spanning the nonzero entries in the PDF. Index values outside these ranges will always return zero probability values; only values within these ranges must be looked up.

Thresholding the ratio of skin to non-skin PDF's, or the combined skin PDF, results in a binary image (containing only 1's and 0's). Pixel values in the binary image containing a 1 correspond to skin pixels while pixel values equal to 0 correspond to non-skin pixels. The skin detection threshold, $\tau$, is selected such that the performance of the skin detector is optimized. Setting the threshold too low results in too many skin pixels and setting it too high results in too few skin pixels. A skin receiver operating characteristic (ROC) curve can be used to select an optimum skin threshold, $\tau$. To generate a skin ROC curve, skin detection is applied to ground truth skin and non-skin pixel data. The probability of false positive (the fraction of pixels that were mistakenly classified as skin) is plotted against the probability of true positive (the fraction of pixels that were correctly classified as skin) for a range of skin threshold values, $\tau$. The value of $\tau$ that provides between 80% and 90% true positive rate can be selected. A false positive rate between 10% and 20% is typically obtained. Preferably, $\tau$ is selected from the point defined as the 'equal error rate' of the ROC curve. This is where $P_{falseRejection} = P_{falseDetection}$, where $P_{falseRejection} = 1 - P_{correctDetection}$.

Those skilled in the art will appreciate that once $\tau$ is selected, the PDF can be thresholded and stored in single bits. Alternatively, storing the PDF with more precision enables adaptive adjustment of $\tau$ based on other analysis.

In checking for the presence of skin in an evaluation image, pixels are run through a three-dimensional lookup table (3DLUT) that produces a value indicating the probability of a pixel being a skin pixel, given the color of the pixel. The image can be preselected for this analysis by use of camera metadata, such as focus distance, focal length, and scene brightness. The resulting image produces using the 3DLUT shows the probability of each pixel being a skin pixel. Counting the number of pixels that have a skin probability over a predetermined threshold produces a feature that correlates with the probability a scene is a portrait. If the total number of skin pixels in the binary skin map is greater than or equal to the predetermined threshold, then the scene is determined to be a portrait scene.

Alternatively, connected component analysis (described, for example, in Haralick, Robert M., and Linda G. Shapiro. *Computer and Robot Vision, Volume I*. Addison-Wesley, 1992. pp. 28-48), can be applied to the binary skin map. The connected component analysis converts the binary image to a list of connected regions of pixels with the same value. In this case, the result is a list of connected regions of skin pixels. The largest connected skin pixel region is selected and the number of pixels in the region is found. If the number of pixels in the largest connected region is greater than or equal to a predetermined threshold, then the scene is determined to be a portrait scene.

A higher rate of true positives is obtained if the method using connected region component analysis is used. This is due to the fact that large regions of connected skin pixels are more likely to exist in scenes containing people's faces. A large number of small connected regions are unlikely to exist in portrait type scenes containing faces. The method of thresholding against the total number of skin pixels in the skin map may result in more false positives than thresholding against the size of the largest connected region.

An alternative method of integrating skin detection into the classification of portrait scenes is to create a membership (weighting) function for the each scene type in which the parameter is total number of skin pixels, or the total number of pixels in the largest connected region of skin pixels. The membership function can be determined from the statistics of skin pixel distributions in images taken from a database of scenes. For example, a database of images captured using the same type of digital camera is formed. Images in the database are manually classified into scene type. Skin detection is applied and the total number of skin pixels detected in each image is computed. A histogram that describes the frequency of scenes as a function of total number of skin pixels is created for each scene type. A membership weighting function can be determined simply by normalizing the frequency distribution. The skin analysis statistics are combined with the image magnification, lens focal length, and scene brightness to compute an overall degree of portrait-ness. If the scene is determined to be a portrait (having the highest probability among the available choices), then capture parameters are set for capturing a portrait scene.

To save computing resources, skin detection can be performed only if other analysis (such as focus distance and focal length) indicates a reasonable probability that a scene could be a portrait, saving computing resources. Alternatively, more accuracy in identifying portrait scenes can be obtained if skin detection is always used and the skin-based probability is combined with portrait type probability based on other measures.

The capture state defined for a portrait scene can include parameters setting the exposure control system to use the widest aperture possible and provide a low exposure index to minimize noise.

Another example of simple feature analysis is the preparation of a histogram of scene colors and comparison of the histogram to one or more predetermined color distributions that are characteristic of important capture scenarios, such as capture of a sunset. Another simple analysis is to prepare and analyze an exposure histogram to establish the exposure range of the image. This information can be used, in a manner well known to those of skill in the art, to determine if a flash exposure or use of fill flash would be warranted.

The analyses 110, 115, 122, 123, and 124 of the first assessment define a capture state, which may or may not be different than an initial default capture state assumed by the camera prior to the analyses. This capture state is or can be used to capture more evaluation images. The defined capture state is redetermined at each iteration of the evaluation cycle and changes with changes in scene and exposure conditions. Camera settings can be changed at this time to match the defined capture state or the change in camera settings can be delayed until needed.

Because of the time-critical nature of scenes with motion, the evaluation cycle of FIG. 8 includes a first decision point is to determine whether the scene is an action scene. The detected motion is compared to a predetermined motion threshold. The particular motion threshold used is a function of the type of motion analysis performed and can be determined heuristically. If the motion analysis 115 indicates motion in excess of the predetermined threshold, then the scene is determined to be an action scene and the parameters of the capture state are set (135) for optimum capture of action. For example, the exposure control parameters are set to maintain a limited exposure time, adjusting gain and aperture accordingly. The limit on exposure time can be calculated from an estimate of the amount of motion in the scene. Alternatively, the limit on exposure time is allowed to vary as a function of ambient light level and scene content. This allows a balancing of motion blur against image noise.

In a particular embodiment, capture settings have an exposure index that is automatically calculated from the estimated scene brightness. This can be implemented using a simple table that has estimated scene brightness as the index variable and provides an exposure index or exposure value output. In this table, the exposure index decreases as the scene brightness increases. For an action scene, a table with a higher set of exposure index values is used. The rate at which exposure increases as brightness drops provides a balancing of motion blur with noise for a predetermined average scene.

In another embodiment, a capture setting is determined by selecting a fixed exposure time and calculating aperture and exposure index using a shutter-priority exposure program. Exposure (aperture, exposure index, flash control, exposure time) control calculations can be performed ahead of as needed. The intent here is to meet the simple objective of limiting motion blur.

After setting capture parameters for optimum capture of motion, a determination is made (155) as to whether the user has triggered capture of a final image. If triggered, final image capture is initiated (195). If final image capture has not been triggered, then complex feature analysis (150) is begun. Complex feature analysis (150) also begins following a determination (130) that the scene is not an action scene.

Referring initially to FIG. 8, in embodiments illustrated by this figure, the complex feature analysis (150) considers additional evaluation images and provides a second assessment. Complex feature analysis (150) can also consider the first assessment. Each of the assessments can be based upon two or more evaluation images. For convenience, the discussion of FIG. 8, generally refers to a particular embodiment, in which the complex feature analysis considers a first assessment based upon an initial set of evaluation images and a second assessment based upon one additional evaluation image. Like considerations apply to other embodiments. The complex feature analysis considers the same kind of analyses as earlier discussed: focus analysis 110, motion analysis 115, exposure analysis 122, balance analysis 123, and simple feature analysis 124, but over the longer time interval of the initial evaluation images and the additional evaluation images. Complex feature analysis (150) can also include any analysis that takes longer than a few milliseconds and, thus, does not fit into the simple feature analysis (124).

During complex feature analysis (150), a determination (160) is made whether capture (170) of an additional evaluation image is needed. When highlights are determined to be significantly clipped or shadows are determined to be blocked up, an additional evaluation image at lower or higher exposure is captured (170). For highlights, the additional evaluation image is at a capture setting that provides a lower exposure level (such as ¼ the previous exposure). For blocking up of scene shadows, an alternate evaluation image at higher exposure (such as 2 or 4 times the previous exposure) is requested. This additional evaluation image is considered in the continuing complex feature analysis (150) with the knowledge that the respective capture setting was deliberately at a lower or higher exposure relative to the other evaluation images under analysis. If the darker or lighter additional evaluation image has only limited clipping of highlights or blocking of shadows, then the additional evaluation image can be analyzed in relation to other criteria, such as whether the scene has color characteristics of a sunset. It is preferred that only one or two additional evaluation images be captured, so that the displayed images on the digital viewfinder or camera display do not become jerky or non-responsive to the efforts of the user to compose the scene. For this reason, the capture settings of the additional evaluation images are preferably adjusted to maximize available information, as opposed to approximating the final capture setting.

The preview display 120 can be adjusted to compensate for the darker or lighter exposure, so that the user is presented visually consistent display images. Some or all of the previous evaluation image can be carried over for display purposes, by compositing blocks or segments of different evaluation images to form each display image. Alternatively, evaluation images at different exposures can be captured and presented on the display or the display can keep showing an earlier image in place of an additional evaluation image. These approaches result in momentary degradations of live digital viewfinding, but it is expected that such degradations would be acceptable to the user.

One simple determination of tonality accumulations that can be used, is based on the cumulative histogram of the luminance channel of the evaluation image. A cumulative histogram having more than a predetermined percentage of pixels over or under a predetermined highlight threshold is considered to have highlight clipping or shadow block up, respectively. In a particular embodiment, having 10 percent or more of the pixels above a highlight threshold indicates highlight clipping and having more than 30 percent of the pixels below a shadow threshold indicates shadows are blocked up.

After the complex feature analysis (150) is completed a decision is made that no further additional evaluation images are needed and a final capture state is set (180) to provide an optimum capture of the final image of the scene.

Figure 11:
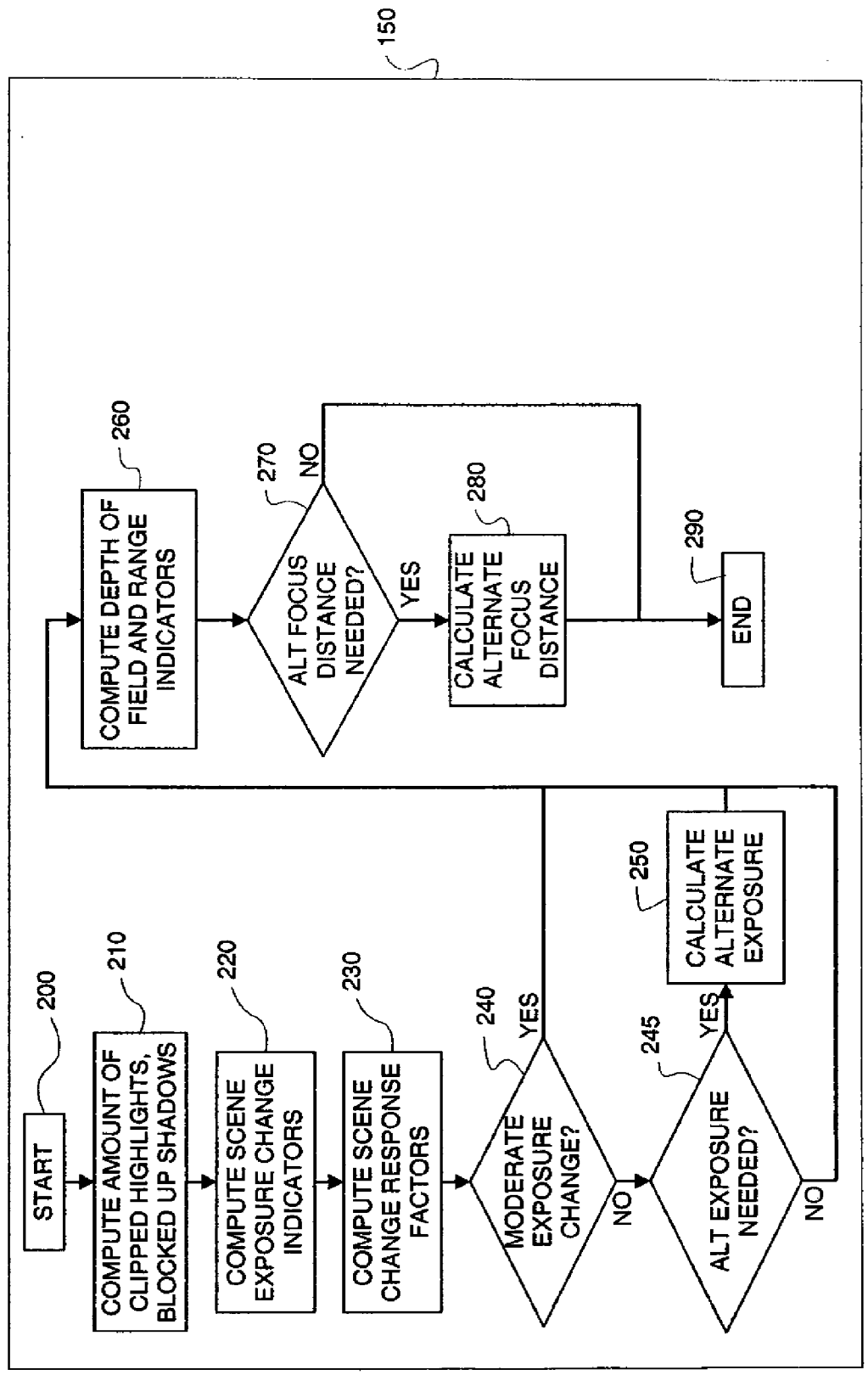
FIG. 11 is a detailed flow diagram of complex feature analysis in the methods of FIGS. 8 and 10.

FIG. 11 shows the processing flow for the complex feature analysis (150) of FIG. 8. Complex feature analysis starts at block (200). The first analysis (210) is to analyze for highlight clipping and blocking up in shadows. A simple way to perform this is to count the number of pixels at or above a highlight threshold and those at or below a shadow threshold. A histogram of the luma (Y) channel of a YCbCr evaluation image makes this very efficient. This process is quite simple, and suffices for most scenes. If processing power is available to produce a range map with adequate resolution, the range map is coupled with analysis of which regions in the scene are clipped or blocked up. If the range map and other analysis suggests a clear main subject in the midtone region, then the significance of the clipped or blocked up regions is lessened. Indicators for changes in scene exposure are then calculated (220).

The purpose here is to determine whether the scene is changing in brightness. If no change or a small change in scene brightness is detected, it is assumed that the brightness will remain unchanged for the time required to capture and analyze a evaluation image with the camera in an alternative capture state. If a large change in scene brightness is detected, it is assumed that the current capture state is inappropriate and that capture and analysis of another evaluation image is needed to determine a new capture state. If a moderate change in scene brightness is detected, it is assumed that it is better to capture a final image with the camera in the current capture state than to delay for the time necessary to capture and analyze another evaluation image. These assumptions have been determined to be practical for most consumer picture-taking.

A simple calculation for scene exposure change is to compare the number of highlight pixels, the number of shadow pixels, and the mean of all other pixels in the evaluation image with the same statistics from the previous evaluation image. When making this comparison, any change in camera exposure (gain, aperture, integration time, etc) is considered so as to limit the determination to actual scene brightness differences. A simple way to accomplish this is to use a lookup table to adjust the histogram of the previous evaluation image for any change in camera exposure and recalculate the highlight, midtone, and shadow statistics. This method has limited accuracy when large exposure changes are being made, but that accuracy is sufficient for the purposes here.

Figure 13:
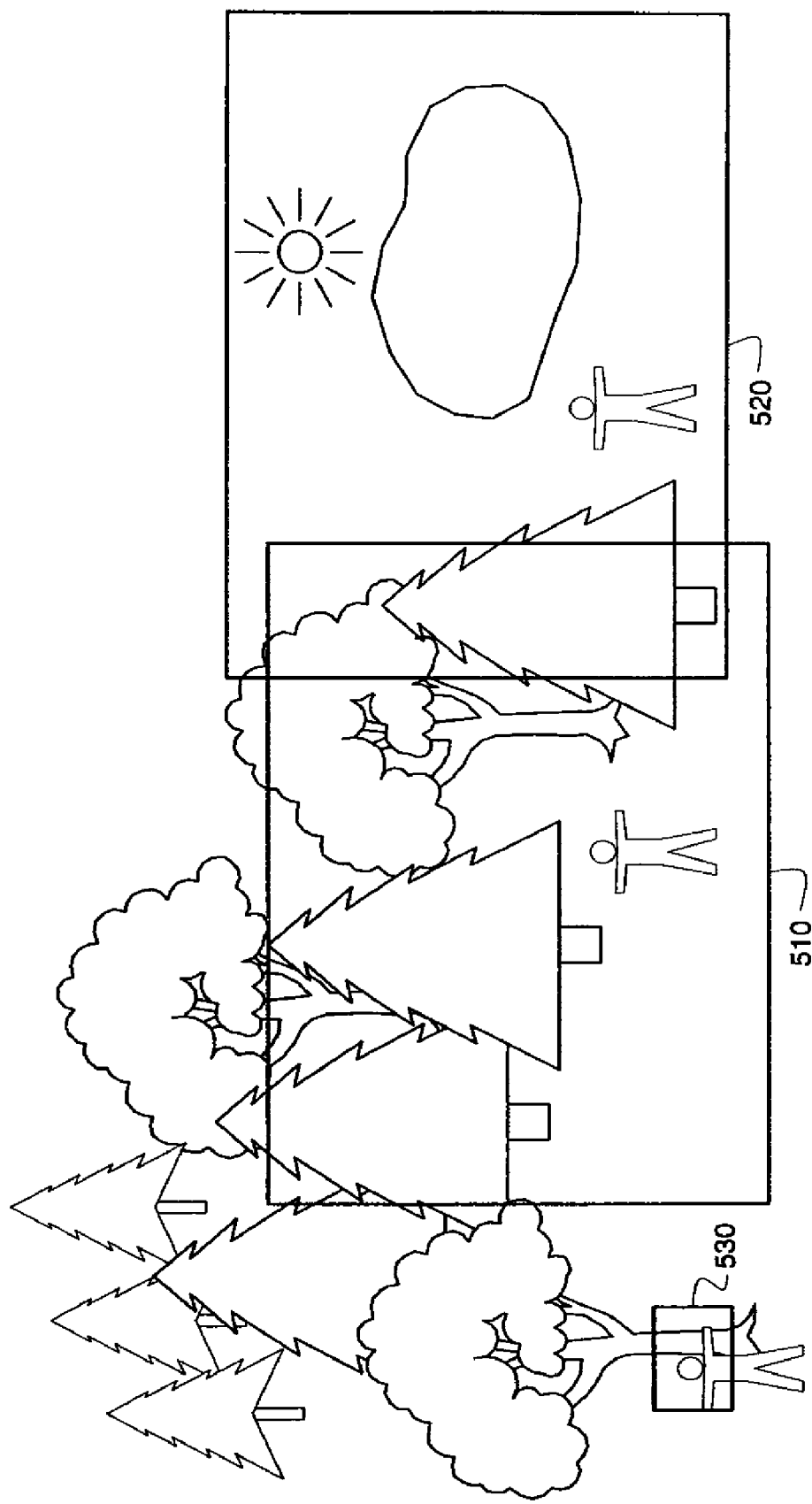
FIG. 13 illustrates different scene compositions that are subject to different treatment by the camera of FIG. 1.

Referring again to FIG. 11, the next step is calculation (230) of scene change response factors. This analysis can be used to tune adaptive temporal filters to speed up response when the scene content is deemed to be changing, or to provide greater smoothing when scene content is stable. For example, exposure changes should be quick to respond when the scene composition is changing, yet should be damped when the scene composition is stable. FIG. 13 illustrates a scenario, in which such analysis is useful. Frame 510 outlines one possible capture composition that is largely a forest scene with a person in the foreground. Frame 520 outlines another possible capture composition that is a sunset with a person in the foreground. Frame 530 outlines another possible capture composition that is largely a portrait with a forest background. As a user composes each capture, such as frame 520, the method provides that modest motions yield essentially stable balance, exposure, and focus behavior. However, when the user shifts from one composition to another, such as frame 520 to 510, the method enables rapid adjustment of the capture settings for each dramatically different composition. The same occurs with user composition of the scene using zoom (focal length) changes.

The determination of scene changes is based primarily on similarity of focus analysis 110, motion analysis 115, exposure analysis 122, balance analysis 123, and zoom from evaluation image to evaluation image. For example, small global motion estimates are consistent with normal camera jitter, while a larger range of motion estimates, with vectors going in different directions, indicates significant scene motion. Further, a set of motion vectors with similar values (and significant magnitude) indicates a deliberate user change of scene. This would be a pan in the case of video; in the case of preview before a still capture, it is simply a change in composition. Small changes in the exposure histogram indicate minor scene changes that don't require balance or exposure changes, while large changes indicate a need for rapid changes in exposure and balance. Other metrics, such as changes in edge maps from image to image, require more processing, but can provide more precise indicators of what is changing from image to image. Those skilled in the art will appreciate that other metrics can be used, especially as available processing power increases.

After calculation of scene change response factors comes the decision block 240, testing whether the evaluation images indicate a moderate exposure change. If a moderate exposure change is found, then control goes to block 260 to compute depth of field and range indicators. This allows moderate changes in exposure to stabilize without taking time to obtain one or more additional evaluation images at alternate exposures. If the scene exposure is stable or a substantial change in exposure is found, then the process proceeds to decision block 245 testing whether an additional evaluation image at a different capture setting is needed to provide an alternate exposure. This decision is based on whether there is significant clipping of highlights or blocking up in shadows. If either of these is true, then the capture setting to provide the alternate exposure is calculated in block 250. The alternate exposure is either much lower (if clipped highlights are more significant than blocked up shadows) or much higher (if clipped highlights are less significant than blocked up shadows).

The capture setting of the additional evaluation image is also based upon a comparison (260) of depth of field and range information. This involves estimating the best focus distance (or range) for each of multiple regions in the composed scene, such as each region 90 of the scene 92 in FIG. 13. The focus distance, zoom position, and aperture of the current capture state allows computation of the nearest and farthest distances for which scene content is sharply resolved. The range for each region in the scene is compared to the depth of field delivered by the optical system. For each region of the scene, it can either be within the depth of field of the optical system, too close, too far, or unknown.

If a significant number of regions are determined to be too close, too far, or unknown, then the decision is made (270) to calculate an alternate focus distance. If an alternate focus distance is needed, the desired alternate focus distance is calculated (280). If the regions that are not in adequate focus are generally considered too far, then a farther focus distance is chosen, particularly one that provides a depth of field that overlaps with the depth of field in the current evaluation image. If the regions that are not in adequate focus are generally considered too close, then a close focus distance is chosen, particularly one that provides a depth of field that overlaps with the depth of field in the current evaluation image.

Acquisition of the additional evaluation image at an alternate focus distance allows the complex feature analysis to make better range estimates for different regions within the scene. The range is coupled with cues derived from the exposure, balance, and other analysis to provide a best selection of main subject location. This intelligent analysis can provide a final capture state altering the depth of field to include all subject content. The depth of field is controlled by adjusting the aperture. For example, the depth of field may be controlled to specifically include all faces in a scene, leaving background less in focus. Alternatively, the depth of field can be adjusted to include only the largest or most central face in the scene, leaving others less in focus. This depth of field approach, unlike standard auto-focus systems, provides automatic depth of field adjustment.

In a camera with a switchable macro element and control 2, focus distance will be controllable in at least two switchable ranges. With two ranges of focus distances available, the estimated range data is compared with both sets of focus distances and the macro control is switched accordingly to accommodate the range of scene content.

After calculation of an alternate focus distance (if needed), control passes to block 290, and exit from FIG. 11. Upon exit from FIG. 11, flow returns to FIG. 8.

It is preferred that the complex feature analysis (150) includes a determination of subject and background that uses range data from the rangefinder or from focus analysis for the different regions of the scene image. The criteria used for separating the different regions into subject and background can vary, depending upon expected camera usage. A convenient criteria is that a region is background if the measured distance for the region is greater than some multiple of the measured distance of the nearest region and a region is subject if the measured distance is less than or equal to that multiple of the measured distance of the nearest region. A convenient multiple is two. Another convenient criteria that can be applied by itself or in combination with the last criteria; it that a region is background if the measured distance corresponds to the infinity distance for the taking lens. For example, with some lens settings, this distance is 12 feet or greater. Another criteria that can be applied by itself or with one or more other criteria, is that outer regions of the image are background. This criterion is most useful if applied as a counterpart to a determination of close inner regions of the image. Another criteria is, if the flash unit has fired, then brighter regions or regions that are both brighter and closer represent the subject and other regions are background. This criterion is conveniently used as a fallback when other distance-based criteria are ambiguous. Still another criteria is that if the rangefinder detects only subject matter at the infinity distance, then regions that are brighter or bluer or both are considered sky. An advantage of the criteria just mentioned is simplicity. Other, more complex criteria, such as pattern detection, can also be used.

In a particular embodiment, the method includes user input in the determination of a final capture state. This can be useful with scenes having too large an exposure range to capture in a single image and is conveniently provided as an option to fully automatic camera self-determination. Following the complex image analysis, the user can be offered a simple choice of capturing an image with more highlight information or more shadow information. Alternatively, the user can be given these two choices and a third alternative, staying with the final capture state self-determined by the camera. Other variations, including estimating several alternatives and only showing those that are significantly different, are also possible. The camera can display a best estimate of exposure in the main preview display and shows one or two small inset images previewing alternative (highlight or shadow) exposures. A simple selector switch or other input control can be provided to allow the user to select one of the alternate exposures. If the user decides to captures the image without selecting either of the alternate exposures, the default case is used. The alternative capture states could be indicated by icons or the like, but this is not preferred, since it is easier for the user to view the proposed results. Icons such as text or pictures can also be used in addition to images, as can an audible prompt.

Changes in depth of field and focus zone can be presented in a similar manner. Areas of the presented evaluation images detected at various distances can be blurred or sharpened digitally to mimic optical blurring and sharpening resulting from changes in lens focus and depth of field.

Other alternative capture states can be presented in the same manner. For example, if the camera detects a dark subject against a dark background that is out of flash range the camera can suggest two capture options: one for normal flash, depicted by lightening the subject only; and another for night portrait, depicted by lightening the subject and lightening the background to some degree. In night portrait, the subject is mainly exposed by flash illumination, but the shutter remains open long enough to provide an ambient light background exposure. Night portrait mode is designed for situations in which a flash exposure sufficient for a foreground subject is insufficient to illuminate the background adequately. With night portrait mode, the subject is well exposed by the flash against a visible background. In keeping with the goal of intelligent simplicity, motion analysis can be coupled with the distance and ambient light analysis. If the camera is being held quite steady, it could automatically engage night portrait mode. If a modest degree of motion is detected, insufficient to suggest a typical action scene but enough to cause significant blur with a long exposure, then the camera can default to normal flash usage. Additional non-image data can also be used to complement the image data in the above analyses.

In order to maintain a consistent rate for display refresh or by reason of other processing constraints, the processing in step (150) can be partitioned to execute in small increments, so a portion of the block can be executed every preview cycle (display of the next evaluation image to the user). The complex feature analysis is completed over multiple preview cycles. The additional cycles each include a new first assessment of a new pair of initial evaluation images. Individual analyses that are relatively slow, but only consider previously captured evaluation images, can be made interruptible so as to execute over multiple cycles. In this case, the analyses can also begin during preparation of the first assessment and can be completed during the complex feature analysis of the same cycle or a later cycle. This approach can be used in other activities that are also utilizing processing resources. For example, activities such as compressing and writing a video to storage and transmitting captured images over a wireless network connection that can heavily load the processor, can be executed over multiple cycles.

Further complex processing can be included, subject to the constraints already discussed. Such processing can include use of adaptive tone scales, adaptive color processing, geometric corrections, or even particular special effects.

The assessments can also be used in determining post-capture processing of final images. Depending on the magnification and size of largest connected region of skin pixels in the scene, the spatial processing capture parameters can be adjusted to optimize sharpening for the image. For example, preferred sharpening for a close-up portrait is significantly less than for a standard scene. Optimum sharpening and noise reduction parameters can be determined by analyzing the textures in the skin regions. Skin regions with very little texture suggest greater sharpening can be applied, while skin regions with greater texture suggest sharpening be minimized. More complex processing (such as blemish concealment and expression enhancement) are optimized as well, if the processing constraints in the camera can support more complex processing. For example, the evaluation image can be analyzed to determine eye positions within the image and locate faces. This kind of geometric analysis allows both reliable detection of faces and estimation of face size, which helps in optimization of sharpening and other enhancements. This approach requires greater computing resources.

After the final capture state is set a check is made (190) as to whether capture of the final image has been triggered. If final image capture is not required, the evaluation preview process ends (198). If final image capture has been triggered, the final image is captured (195) and control continues to the end (198). After end 198, the process returns to the start (100). Final image capture (195) can be immediately followed by all necessary processing of the final image or the final image can be buffered for later processing.

Figure 12:
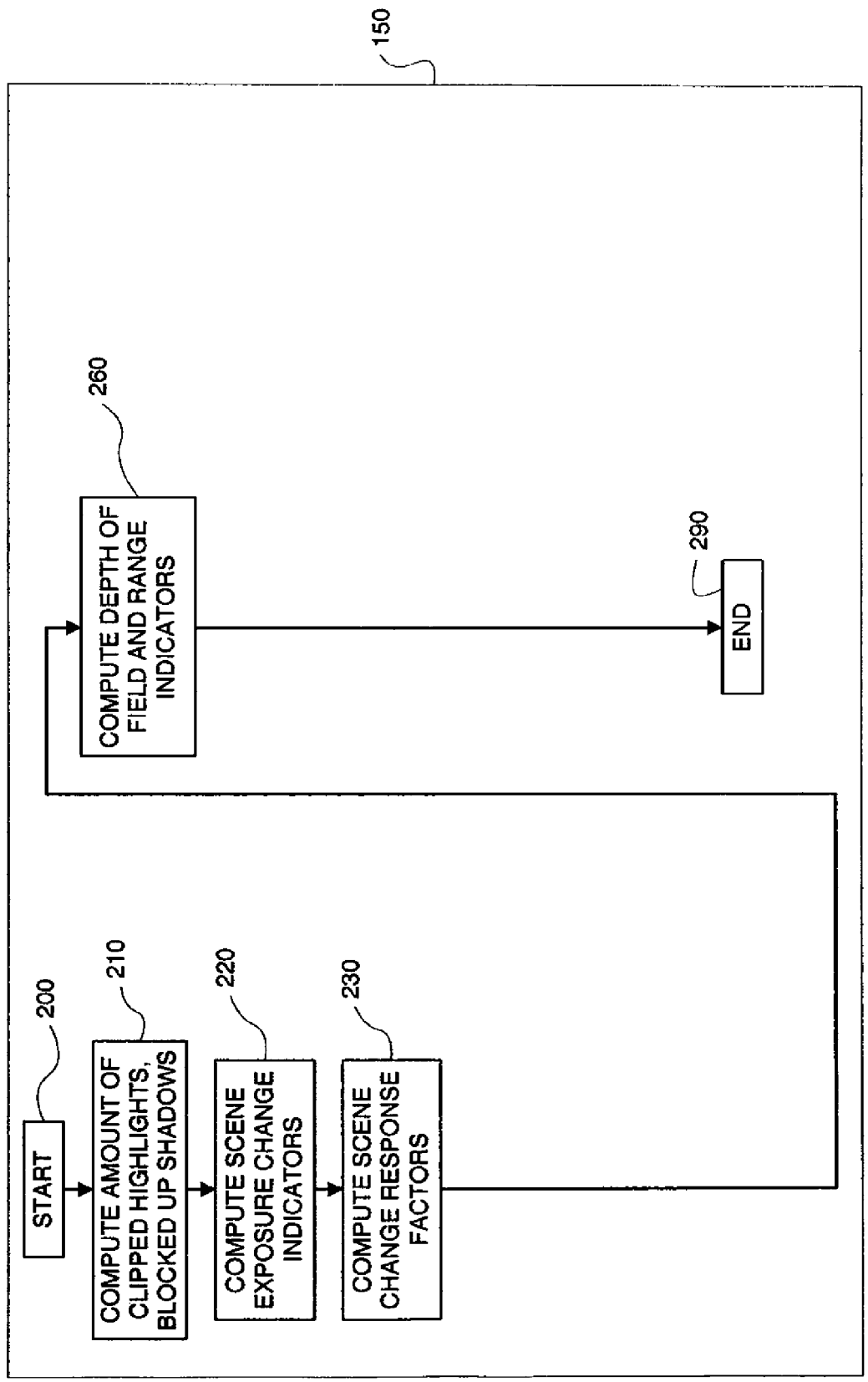
FIG. 12 is a detailed flow diagram of complex feature analysis in the method of FIG. 9.

FIG. 9 shows the overall decision flow used in another embodiment in a digital still camera. This embodiment differs from FIG. 8, in that the complex feature analysis (150) is limited to the initial evaluation images and analysis of additional evaluation images is eliminated. This is illustrated in FIG. 12, in which the remaining steps of the complex feature analysis correspond to like numbered steps earlier discussed in relation to FIG. 8, with the exception that all steps are limited to the initial evaluation images. The approach of FIG. 9 significantly reduces processing requirements and firmware complexity, but this embodiment is less able to optimize the final capture setting for scenes with broad exposure range or depth of subject matter.

FIG. 10 shows the overall decision flow used in still another embodiment in a digital still camera. This embodiment differs from FIG. 8, in that motion analysis is eliminated. The complex feature analysis of FIG. 10 is that of FIG. 11. The approach of FIG. 10 reduces processing requirements, but cannot identify and respond to action scenes.

The invention has been described in detail with particular reference to certain particular embodiments thereof, but it will be understood that variations and modifications can be effected within the spirit and scope of the invention.

The invention claimed is:

1. A method for setting a camera for image capture, said method comprising the steps of:
   capturing an initial set of two or more evaluation images;
   assessing a plurality of characteristics of said initial set of evaluation images to provide a first assessment, said characteristics including subject motion vectors between at least two of said initial set of evaluation images;
   when said subject motion vectors are in excess of a predetermined threshold, setting a final capture state of said camera responsive to said first assessment and enabling immediate capture of a final image without further assessment;
   when said subject motion vectors are less than said predetermined threshold:
   (a) providing a second assessment of the evaluation images;
   (b) analyzing the second assessment; and when said subject motion is less than said predetermined threshold,
      (i) presenting results of said analyzing to a user as a simple choice between offered alternatives, based on said analyzing; and
      (ii) accepting user choice input following said presenting; and
   (c) setting said final capture state of said camera responsive to said user input.

2. The method of claim 1 wherein said second assessment in part (b) further comprises determining one or more additional characteristics from said initial set of evaluation images, said determining being more computationally intensive than the first said assessment.

3. The method of claim 2 wherein said additional characteristics include differences in edge maps.

4. The method of claim 1 wherein said characteristics include one or more of: depth of field, color balance, and focus.

5. The method of claim 1 further comprising classifying said scene in one of a plurality of predetermined classifications based on said analyzing to provide a scene classification, and wherein said capture state is responsive to said scene classification.

6. The method of claim 5 wherein said assessing of said plurality of characteristics further comprises ascertaining, exposure range, focus, white balance, and skin detection.

7. The method of claim 1 wherein said camera is in a default capture state during said capturing of said initial set of evaluation images and wherein each of said capture states includes settings of a plurality of: focal length, exposure time, focus distance, aperture, white balance adjustment, and flash state.

8. The method of claim 1 wherein one or more additional evaluation images are captured after the first assessment of evaluation images and are added to the set of evaluation images before the second assessment.

* * * * *